US010597481B2

(12) United States Patent
Uehara et al.

(10) Patent No.: US 10,597,481 B2
(45) Date of Patent: Mar. 24, 2020

(54) HYDROGENATED BLOCK COPOLYMER

(71) Applicants: KURARAY CO., LTD., Kurashiki-shi (JP); AMYRIS, INC., Emeryville, CA (US)

(72) Inventors: Yosuke Uehara, Kamisu (JP); Hiromitsu Sasaki, Kamisu (JP); Daisuke Konishi, Kamisu (JP); Masahiro Kato, Kamisu (JP)

(73) Assignees: KURARAY CO., LTD., Kurashiki-shi (JP); AMYRIS, INC., Emeryville, CA (US)

( * ) Notice: Subject to any disclaimer, the term of this patent is extended or adjusted under 35 U.S.C. 154(b) by 0 days.

(21) Appl. No.: 15/548,640

(22) PCT Filed: Feb. 5, 2016

(86) PCT No.: PCT/JP2016/053527
§ 371 (c)(1),
(2) Date: Aug. 3, 2017

(87) PCT Pub. No.: WO2016/125899
PCT Pub. Date: Aug. 11, 2016

(65) Prior Publication Data
US 2018/0030194 A1 Feb. 1, 2018

(30) Foreign Application Priority Data

Feb. 6, 2015 (JP) ................................. 2015-022444
Jun. 17, 2015 (JP) ................................. 2015-122339

(51) Int. Cl.
| | | |
|---|---|---|
| C08F 297/04 | (2006.01) | |
| C08F 8/04 | (2006.01) | |
| C08F 236/10 | (2006.01) | |
| C08F 236/22 | (2006.01) | |
| C08F 236/06 | (2006.01) | |
| C08F 236/08 | (2006.01) | |
| D04H 1/4282 | (2012.01) | |
| D04H 3/007 | (2012.01) | |
| D01F 6/28 | (2006.01) | |
| B29C 43/02 | (2006.01) | |
| C08J 5/18 | (2006.01) | |
| B32B 27/00 | (2006.01) | |
| C09J 153/02 | (2006.01) | |
| C08L 53/02 | (2006.01) | |
| C08L 25/10 | (2006.01) | |
| C08L 23/00 | (2006.01) | |
| B32B 27/30 | (2006.01) | |

(52) U.S. Cl.
CPC ............ *C08F 297/04* (2013.01); *B29C 43/02* (2013.01); *B32B 27/00* (2013.01); *B32B 27/302* (2013.01); *C08F 8/04* (2013.01); *C08F 236/06* (2013.01); *C08F 236/08* (2013.01); *C08F 236/10* (2013.01); *C08F 236/22* (2013.01); *C08F 297/044* (2013.01); *C08J 5/18* (2013.01); *C08L 23/00* (2013.01); *C08L 25/10* (2013.01); *C08L 53/025* (2013.01); *C09J 153/02* (2013.01); *C09J 153/025* (2013.01); *D01F 6/28* (2013.01); *D04H 1/4282* (2013.01); *D04H 3/007* (2013.01); *C08J 2353/02* (2013.01)

(58) Field of Classification Search
None
See application file for complete search history.

(56) References Cited

U.S. PATENT DOCUMENTS

| | | | | |
|---|---|---|---|---|
| 7,070,051 | B2 * | 7/2006 | Kanner | A61B 17/06133 206/382 |
| 2010/0056714 | A1 | 3/2010 | McPhee | |
| 2015/0197588 | A1 | 7/2015 | Uehara et al. | |
| 2016/0053144 | A1 | 2/2016 | Sasaki et al. | |

FOREIGN PATENT DOCUMENTS

| | | |
|---|---|---|
| EP | 3 103 828 A1 | 12/2016 |
| JP | 2777239 B2 | 7/1998 |
| JP | 2010-90267 A | 4/2010 |
| JP | 2012-502135 A | 1/2012 |
| JP | 2012-502136 A | 1/2012 |
| WO | 2013/183570 A1 | 12/2013 |
| WO | 2014/156651 A1 | 10/2014 |
| WO | 2015/087954 A1 | 6/2015 |
| WO | 2015/087955 A1 | 6/2015 |
| WO | 2015/067953 A1 | 8/2015 |

OTHER PUBLICATIONS

International Search Report dated Apr. 26, 2016, in PCT/JP2016/053527, filed Feb. 5, 2016.
Extended European Search Report dated Aug. 13, 2018 in Patent Application No. 16746730.7, citing document AO therein, 7 pages.

\* cited by examiner

*Primary Examiner* — Frank D Ducheneaux
(74) *Attorney, Agent, or Firm* — Oblon, McClelland, Maier & Neustadt, L.L.P.

(57) ABSTRACT

A hydrogenated block copolymer prepared by hydrogenating a block copolymer that contains a polymer block (A) containing a structural unit derived from an aromatic vinyl compound, a polymer block (B) containing a structural unit derived from farnesene, and a polymer block (C) containing a structural unit derived from a conjugated diene except farnesene, wherein the block copolymer contains at least two above polymer blocks (A), at least one above polymer block (B) and at least one above polymer block (C), and wherein at least one above polymer block (B) is at the terminal, and the hydrogenation rate of the carbon-carbon double bond in the polymer block (B) and the polymer block (C) is 50 mol % or more.

19 Claims, No Drawings

HYDROGENATED BLOCK COPOLYMER

TECHNICAL FIELD

The present invention relates to a hydrogenated block copolymer that contains a polymer block containing a structural unit derived from farnesene.

BACKGROUND ART

Hydrogenated block copolymers constituted of a polymer block containing a structural unit derived from an aromatic vinyl compound and a polymer block containing a constitutional unit derived from a conjugated diene exhibit properties similar to those of vulcanized rubbers without subjecting the copolymers to vulcanization, i.e., are excellent in damping property, flexibility, rubber elasticity and weather resistance, and therefore have been extensively used in the applications such as sundries, parts for automobiles, various industrial parts, etc.

The hydrogenated block copolymers are produced, for example, by subjecting a block copolymer obtained by sequentially polymerizing an aromatic vinyl compound and a conjugated diene such as isoprene and butadiene to hydrogenation (for example, refer to PTLs 1 to 3).

Meanwhile, PTLs 4 and 5 describe a polymer of β-farnesene, but fail to make a sufficient study on practical properties thereof.

CITATION LIST

Patent Literature

PTL 1: JP 2777239 B
PTL 2: JP 2010-090267 A
PTL 3: WO2013/183670
PTL 4: JP 2012-502135 A
PTL 5: JP 2012-502136 A

SUMMARY OF INVENTION

Technical Problem

The hydrogenated block copolymers disclosed in PTLs 1 and 2 are excellent in molding processability, but there is still room for improvement in molding processability.

Thus, an object of the present invention is to provide a novel hydrogenated block copolymer that is still more excellent in molding processability, a method for producing it, and a hydrogenated block copolymer composition containing the hydrogenated block copolymer.

Another object of the present invention is to provide a molded article, a laminate, a film, a fiber, a nonwoven fabric, an adhesive and an elastic member using the hydrogenated block copolymer or the hydrogenated block copolymer composition.

Still another object of the present invention is to provide a protective film formed of the laminate or the film, and a decorative molding material containing the laminate, the film, the fiber or the nonwoven fabric.

Solution to Problem

The gist of the present invention includes the following [1] to [12].
[1] A hydrogenated block copolymer prepared by hydrogenating a block copolymer that contains a polymer block (A) containing a structural unit derived from an aromatic vinyl compound, a polymer block (B) containing a structural unit derived from farnesene, and a polymer block (C) containing a structural unit derived from a conjugated diene except farnesene, wherein the block copolymer contains at least two above polymer blocks (A), at least one above polymer block (B) and at least one above polymer block (C), and wherein at least one above polymer block (B) is at the terminal, and the hydrogenation rate of the carbon-carbon double bond in the polymer block (B) and the polymer block (C) is 50 mol % or more.
[2] A method for producing the hydrogenated block copolymer of the above [1], including a step of producing the polymer block (B), the polymer block (A) and the polymer block (C) in that order to give a block copolymer, and a step of hydrogenating the resultant block copolymer.
[3] A hydrogenated block copolymer composition containing the hydrogenated block copolymer of the above [1], and at least one selected from a polyolefin resin, a tackifier resin and a softening agent.
[4] A molded article using any of the hydrogenated block copolymer of the above [1] and the hydrogenated block copolymer composition of the above [3].
[5] A laminate containing a layer using any of the hydrogenated block copolymer of the above [1] and the hydrogenated block copolymer composition of the above [3].
[6] A film using any of the hydrogenated block copolymer of the above [1] and the hydrogenated block copolymer composition of the above [3].
[7] A protective film containing the laminate of the above [5] or the film of the above [6].
[8] A fiber using any of the hydrogenated block copolymer of the above [1] and the hydrogenated block copolymer composition of the above [3].
[9] A nonwoven fabric using any of the hydrogenated block copolymer of the above [1] and the hydrogenated block copolymer composition of the above [3].
[10] A decorative molding material containing the laminate of the above [5], the film of the above [6], the fiber of the above [8], or the nonwoven fabric of the above [9].
[11] An adhesive using any of the hydrogenated block copolymer of the above [1] and the hydrogenated block copolymer composition of the above [3].
[12] An elastic member produced by molding a thermoplastic elastomer composition containing a hydrogenated block copolymer (I), wherein:
the hydrogenated block copolymer (I) is a hydrogenate of a block copolymer (P) containing:
a polymer block (a) containing a structural unit derived from an aromatic vinyl compound, a polymer block (b) containing 1 to 100% by mass of a farnesene-derived structural unit (b1) and 99 to 0% by mass of a structural unit (b2) derived from a conjugated diene except farnesene, and a polymer block (c) having a content of the farnesene-derived structural unit (b1) of less than 1% by mass and a content of the structural unit (b2) derived from a conjugated diene except farnesene of 1 to 100% by mass,
and containing at least two above polymer blocks (a), at least one above polymer block (b) and at least one above polymer block (c), wherein at least one above polymer block (b) exists at the terminal, and wherein:
the ratio by mass of the above polymer block (a) to the above polymer block (b) [(a)/(b)] is from 1/99 to 70/30, the ratio by mass of the above polymer block (a) to the total of the above polymer block (b) and the above polymer block (c) [(a)/((b)+(c))] is from 1/99 to 70/30, 50 mol % or more of the total of the carbon-carbon double bond derived from farnesene and the carbon-carbon double bond derived from a conjugated diene except farnesene existing in the block copolymer (P) have been hydrogenated, and the hysteresis loss rate in one cycle of deformation and restoration of a specimen is 20% or less, the specimen being prepared by blanking a 0.5 mm-thick sheet formed by compression molding of the thermoplastic elastomer composition at 240° C. and under a load of 10 MPa for 3 minutes into a strip specimen having a width of 25 mm and a length of 150 mm, where the specimen is 100% expanded at a temperature of 23° C. and then shrunk in the cycle of deformation and restoration of the specimen.

Advantageous Effects of Invention

According to the present invention, there can be provided a novel hydrogenated block copolymer more excellent in molding processability and a method for producing it, as well as a hydrogenated block copolymer composition containing the hydrogenated block copolymer.

Also according to the present invention, there can be provided a molded article, a laminate, a film, a fiber, a nonwoven fabric, an adhesive and an elastic member using the hydrogenated block copolymer or the hydrogenated block copolymer composition.

Further according to the present invention, there can be provided a protective film containing the laminate or the film, and a decorative molding material containing the laminate, the film, the fiber or the nonwoven fabric.

DESCRIPTION OF EMBODIMENTS

Hydrogenated Block Copolymer

The hydrogenated block copolymer of the present invention is a hydrogenated block copolymer (hereinafter this may be referred to as "hydrogenated block copolymer (HP)") prepared by hydrogenating a block copolymer (hereinafter this may be referred to as "block copolymer (P)") that contains a polymer block (A) containing a structural unit derived from an aromatic vinyl compound, a polymer block (B) containing a structural unit derived from farnesene, and a polymer block (C) containing a structural unit derived from a conjugated diene except farnesene, wherein the block copolymer contains at least two above polymer blocks (A), at least one above polymer block (B) and at least one above polymer block (C), and wherein at least one above polymer block (B) is at the terminal, and the hydrogenation rate of the carbon-carbon double bond in the polymer block (B) and the polymer block (C) is 50 mol % or more.

<Polymer Block (A)>

The polymer block (A) contains a structural unit derived from an aromatic vinyl compound. Examples of the aromatic vinyl compound include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. These aromatic vinyl compounds may be used alone or in combination of any two or more thereof. Of these aromatic vinyl compounds, preferred are styrene, α-methyl styrene and 4-methyl styrene, and more preferred is styrene.

The polymer block (A) may contain a structural unit derived from a monomer except an aromatic vinyl compound, for example, a copolymerizable monomer to constitute the polymer block (B) to be mentioned hereinunder, a copolymerizable monomer to constitute the polymer block (C) and/or any other copolymerizable monomer, etc. However, the content of the structural unit derived from an aromatic vinyl compound in the polymer block (A) is preferably 60% by mass or more, more preferably 70% by mass or more, even more preferably 80% by mass or more.

<Polymer Block (B)>

The polymer block (B) contains a structural unit derived from farnesene. Here, the wording "contains a structural unit derived from farnesene" means that the content of the structural unit derived from farnesene is more than 30% by mass. The farnesene may be either α-farnesene or β-farnesene represented by the following formula (I). However, from the viewpoint of facilitated production of the block copolymer (P), β-farnesene is preferred. Meanwhile, α-farnesene and β-farnesene may be used as combined.

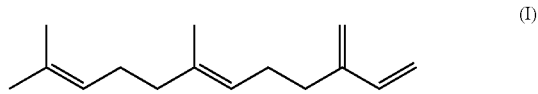

(I)

The polymer block (B) may contain a structural unit derived from a monomer except farnesene, for example, a copolymerizable monomer to constitute the polymer block (A), a copolymerizable monomer to constitute the polymer block (C) to be mentioned hereinunder and/or any other copolymerizable monomer, etc. However, the content of farnesene in the polymer block (B) is preferably 50% by mass or more, more preferably 60% by mass or more, even more preferably 70% by mass or more, further more preferably 80% by mass or more.

<Polymer Block (C)>

The polymer block (C) contains a structural unit derived from a conjugated diene except farnesene. Examples of the conjugated diene include butadiene, isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. These conjugated dienes may be used alone or in combination of any two or more thereof. Above all, preferred are butadiene, isoprene and myrcene. The content of the farnesene-derived structural unit in the polymer block (C) must be 30% by mass or less, and depending on the difference in the content of the farnesene-derived structural unit therein, the polymer blocks (B) and (C) are definitely discriminated from each other.

The polymer block (C) may contain a structural unit derived from a monomer except "a conjugated diene except farnesene", for example, a copolymerizable monomer to constitute the polymer block (A), a copolymerizable monomer to constitute the polymer block (B) and/or any other copolymerizable monomer, etc. However, the content of the conjugated diene except farnesene in the polymer block (C) is preferably more than 60% by mass, more preferably 60% by mass or more, even more preferably 70% by mass or more, and further more preferably 80% by mass or more.

<Other Copolymerizable Monomer>

The above-mentioned polymer block (A), the polymer block (B) and the polymer block (C) may contain the following copolymerizable monomer as the other copolymerizable monomer within a range not detracting from the advantageous effects of the present invention.

Examples of the other copolymerizable monomer include unsaturated hydrocarbon compounds such as propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene; functional group-containing unsaturated compounds such as acrylic acid, methacrylic acid, methyl acrylate, methyl methacrylate, acrylonitrile, methacrylonitrile, maleic acid, fumaric acid, crotonic acid, itaconic acid, 2-acryloylethanesulfonic acid, 2-methacryloylethanesulfonic acid, 2-acrylamide-2-methylpropanesulfonic acid, 2-methacrylamide-2-methylpropanesulfonic acid, vinylsulfonic acid, vinyl acetate and methyl vinyl ether; and the like. These other monomers may be used alone or in combination of any two or more thereof.

When the block copolymer (P) contains any other copolymerizable monomer, the content thereof is, from the viewpoint of molding processability, preferably 40% by mass or less, more preferably 30% by mass or less.

<Properties of Block Copolymer (P)>

The ratio by mass of the polymer block (A) to the total of the polymer block (A), the polymer block (B) and the polymer block (C) [(A)/[(A)+(B)+(C)]] is, from the viewpoint of molding processability, especially film moldability, as well as from the adhesive force of the protective film and the adhesive film to be obtained and the mechanical strength of the nonwoven fabric to be obtained, preferably 5/100 to 80/100, more preferably 10/100 to 50/100, even more preferably 12/100 to 40/100.

Also the ratio by mass of the polymer block (C) to the polymer block (B) [(C)/(B)] is, from the viewpoint of molding processability, especially film moldability, as well as from the adhesive force of the protective film and the adhesive film to be obtained, preferably 5/95 to 95/5, more preferably 10/90 to 70/30, even more preferably 20/80 to 60/40, still more preferably 30/70 to 50/50.

<Properties of Hydrogenated Block Copolymer (HP)>

The hydrogenated block copolymer (HP) is a hydrogenate of the block copolymer (P) containing at least two above copolymer blocks (A), at least one above polymer block (B) and at least one above polymer block (C), and is preferably a hydrogenate of the block copolymer (P) containing two or more polymer blocks (A), two or more polymer blocks (B) and one or more polymer block (C).

The hydrogenated block copolymer of the present invention is a hydrogenate of the block copolymer (P) where at least one above polymer block (B) is at the terminal. Having at least one polymer block (B) at the terminal of the polymer chain, the hydrogenated block copolymer has improved molding processability. In the present invention, the bonding morphology of the polymer block (A), the polymer block (B) and the polymer block (C) is not specifically limited, and may be linear, branched or radial or may be a combination of two or more such forms. In the case where the hydrogenated block copolymer of the present invention is linear, the polymer block (B) preferably exists at both terminals thereof, and in the case where the hydrogenated block copolymer of the present invention is branched or radial, the number of the polymer blocks (B) at the terminal is preferably 2 or more, more preferably 3 or more.

From the viewpoint of molding processability, a morphology where each block bonds to another in a linear form is preferable. The example of the hydrogenated block copolymer includes a tetra-block copolymer represented by [B-A-C-A], a penta-block copolymer represented by [B-A-C-A-B], a poly-block copolymer represented by [B-A-(C-A)$_l$-B], [B-A-(C-A-B)$_m$] or [B-(A-C-A-B)$_n$] (where l, m and n each independently represent an integer of 2 or more), and a mixture thereof, when the polymer block (A) is represented by a, the polymer block (B) is by B and the polymer block (C) is by C. Above all, a morphology where the polymer block (B) is at both terminals of the polymer chain is more preferable.

In this description, in the case where polymer blocks of the same kind bond linearly to each other via a divalent coupling agent or the like, the entire polymer block formed through bonding is dealt with as one polymer block. Accordingly, a polymer block that is intrinsically technically expressed as [A-X-A] (where X represents a coupling agent residue) is expressed as A as a whole. In this description, the polymer block containing a coupling agent residue is dealt with as described above, and therefore, for example, the block copolymer to be technically expressed as [B-A-C-X-C-A-B] is expressed as [B-A-C-A-B] and is dealt with as an example of a penta-block copolymer.

Two or more polymer blocks (A) that the block copolymer (P) has may be polymer blocks of the same structural unit, or may be polymer blocks of different structural units. Similarly, in the case where the block copolymer (P) has two or more polymer blocks (B) or two or more polymer blocks (C), the respective polymer blocks may be polymer blocks of the same structural unit or may be polymer blocks of different structural units.

The hydrogenated block copolymer of the present invention is, from the viewpoint of molding processability, preferably a copolymer containing a structure having the polymer block (B), the polymer block (A) and the polymer block (C) in that order (namely, having a structure of B-A-C), and is more preferably a linear copolymer having that structure.

The peak top molecular weight (Mp) of the hydrogenated block copolymer (HP) is, from the viewpoint of molding processability, preferably 10,000 to 1,500,000, more preferably 60,000 to 1,200,000, even more preferably 70,000 to 1,100,000, still more preferably 75,000 to 900,000, and further more preferably 80,000 to 600,000.

The peak top molecular weight (Mp) of the hydrogenated block copolymer (HP) can be measured according to the method described in the section of Examples to be given hereinunder.

The peak top molecular weight of the polymer block (A) is, from the viewpoint of molding processability, preferably 2,000 to 100,000, more preferably 4,000 to 50,000, even more preferably 5,000 to 30,000.

The peak top molecular weight of the polymer block (B) is, from the viewpoint of molding processability, preferably 2,000 to 200,000, more preferably 3,000 to 150,000, even more preferably 4,000 to 100,000.

The peak top molecular weight of the polymer block (C) is, from the viewpoint of molding processability, preferably 4,000 to 200,000, more preferably 4.500 to 150,000, even more preferably 5,000 to 100,000.

The molecular weight distribution (Mw/Mn) of the hydrogenated block copolymer (HP) is preferably 1 to 4, more preferably 1 to 3, even more preferably 1 to 2. When the molecular weight distribution falls within the range, the molding processability is bettered more.

The order-disorder transition temperature of the hydrogenated block copolymer (HP), as measured through dynamic viscoelastometry, is preferably 290° C. or lower, more preferably 280° C. or lower, even more preferably 260° C. or lower. When the order-disorder transition temperature (ODT) falls within the range, the copolymer can be excellent in molding processability and can be molded at a low temperature, and therefore, in particular, in melt blow molding, degradation can be prevented during molding and the strength of the resultant melt-blown nonwoven fabric increases, and discoloration and offensive odor emission can be prevented.

The order-disorder transition temperature (ODT) of the hydrogenated block copolymer (HP) can be measured according to the method described in Examples to be given hereinunder.

[Production Method for Hydrogenated Block Copolymer (HP)]

The hydrogenated block copolymer (HP) can be favorably produced according to a polymerization step of preparing the block copolymer (P) through anionic polymerization followed by a step of hydrogenatoffing 50 mol % or more of the carbon-carbon double bond in the polymer block (B) and the polymer block (C) in the resultant block copolymer (P).

<Polymerization Step>

The block copolymer (P) can be favorably produced according to a solution polymerization method, and for example, an ionic polymerization such as anionic polymerization, cationic polymerization or the like, or a radical polymerization method is applicable. Above all, an anionic polymerization method is preferred. In an anionic polymerization method in the presence of a solvent, an anionic polymerization initiator and optionally a Lewis base, an aromatic vinyl compound, a farnesene, and a conjugated diene except farnesene are successively added to produce the block copolymer (P).

Examples of the anionic polymerization initiator include alkali metals such as lithium, sodium, potassium, etc.; alkaline earth metals such as beryllium, magnesium, calcium, strontium, barium, etc.; lanthanoid rare earth metals such as lanthanum, neodymium, etc.; compounds containing any of the above-mentioned alkali metals, alkaline earth metals and lanthanoid rare earth metals, etc. Above all, an alkali metal, compounds containing an alkali metal, and organic alkali metal compounds are preferred.

Examples of the organic alkali metal compound include organic lithium compounds such as methyl lithium, ethyl lithium, n-butyl lithium, sec-butyl lithium, t-butyl lithium, hexyl lithium, phenyl lithium, stilbene lithium, dilithiomethane, dilithionaphthalene, 1,4-dilithiobutane, 1,4-dilithio-2-ethylcyclohexane, 1,3,5-trilithiobenzene, etc.; and sodium naphthalene, potassium naphthalene, etc. Above all, organic lithium compounds are preferred, n-butyl lithium and sec-buty) lithium are more preferred, and sec-butyl lithium is even more preferred. The organic alkali metal compound may be used as an organic alkali metal amide after being reacted with a secondary amine such as diisopropylamine, dibutylamine, dihexylamine, dibenzylamine or the like.

The amount of the organic alkali metal compound to be used in polymerization differs depending on the molecular weight of the block copolymer (P) to be produced, but may be within a range of 0.01 to 3% by mass relative to the total amount of the copolymerizable monomers to be reacted.

The solvent is not specifically limited so far as it does not have any negative influence on anionic polymerization, and examples thereof include saturated aliphatic hydrocarbons such as n-pentane, isopentane, n-hexane, n-heptane, isooctane, etc.; saturated alicyclic hydrocarbons such as cyclopentane, cyclohexane, methylcyclopentane, etc.; aromatic hydrocarbons such as benzene, toluene, xylene, etc. One alone or two or more of these may be used either singly or as combined. The amount of the solvent to be used is not specifically limited.

A Lewis base plays a role of controlling the microstructure in the structural unit derived from farnesene and in the structural unit derived from a conjugated diene except farnesene. Examples of the Lewis base of the type include ether compounds such as dibutyl ether, diethyl ether, tetrahydrofuran, dioxane, ethylene glycol diethyl ether, etc.; pyridine; tertiary amines such as N,N,N',N'-tetramethylethylenediamine, trimethylamine, etc.; alkali metal alkoxides such as potassium t-butoxide, etc.; phosphine compounds, etc. In the case where a Lewis base is used, the amount thereof is preferably within a range of 0.01 to 1,000 molar equivalents relative to 1 mol of the anionic polymerization initiator.

The polymerization reaction temperature is within a range of generally −80 to 150° C., preferably 0 to 100° C., more preferably 10 to 90° C. The polymerization reaction mode may be a batch mode or a continuous mode. The monomers may be continuously or intermittently put into a polymerization reaction solution in such a manner that the amount of the aromatic vinyl compound, that of the farnesene and that of the conjugated diene except farnesene in the solution could be each within a specific range, or the monomers may be sequentially polymerized in such a manner that the monomers could be in a specific ratio in the polymerization reaction solution, thereby producing the block copolymer (P).

The polymerization reaction may be stopped by adding an alcohol such as methanol, isopropanol or the like as a polymerization terminator. The resultant polymerization reaction solution is poured into a poor solvent such as methanol or the like to thereby precipitate the block copolymer (P) therein, or the polymerization reaction solution is washed with water, separated and dried to isolate the block copolymer (P).

Preferably, as described above, the hydrogenated block copolymer of the present invention contains a structure that has the polymer block (B), the polymer block (A) and the polymer block (C) in that order, and is therefore preferably produced according to a production method for the hydrogenated block copolymer of the present invention that includes a step of producing the polymer block (B), the polymer block (A) and the polymer block (C) in that order to give a block copolymer, followed by a step of hydrogenating the resultant block copolymer. In the case where the hydrogenated block copolymer of the present invention has the polymer block (B) only at one terminal of the polymer chain, the hydrogenated block copolymer may be produced through a method where the other polymer blocks are previously produced through polymerization so that they could bond to each other linearly, and thereafter the polymer block (B) is produced in the last step.

The hydrogenated block copolymer of the present invention is one prepared by hydrogenating a block copolymer (P) that contains at least two above-mentioned polymer blocks (A), as least one above-mentioned polymer block (B) and at least one above-mentioned polymer block (C), and has at least one above-mentioned block copolymer (B) at the terminal thereof. As a method for producing the block copolymer (P) of the type, there is mentioned a method of polymerizing the above polymer block (B), the above polymer block (A), the above polymer block (C) and the above block polymer (A) in that order, or a method of polymerizing the above polymer block (B), the above polymer block (A) and the above polymer block (C) in that order followed by coupling the terminals of the polymer blocks (C) to each other using a coupling agent, etc. In the present invention, from the viewpoint of efficient production, the latter method of using a coupling agent is preferred.

Examples of the coupling agent include divinylbenzene; polyepoxy compounds such as epoxidated 1,2-polybutadiene, epoxidated soybean oil, tetraglycidyl-1,3-bisaminomethylcyclohexane, etc.; halides such as tetrachlorotin, tetrachlorosilane, trichlorosilane, trichloromethylsilane, dichlorodimethylsilane, dibromodimethylsilane, etc.; ester compounds such as methyl benzoate, ethyl benzoate, phenyl benzoate, diethyl oxalate, diethyl malonate, diethyl adipate, dimethyl phthalate, dimethyl terephthalate, etc.; carbonate compounds such as dimethyl carbonate, diethyl carbonate, diphenyl carbonate, etc.; alkoxysilane compounds such as diethoxydimethylsilane, trimethoxymethylsilane, triethoxymethylsilane, tetramethoxysilane, tetraethoxysilane, tetrabutoxysilane, tetrakis(2-ethylhexyloxy)silane, bis(triethoxysilyl)ethane, 3-aminopropyltriethoxysilane, etc.; 2,4-tolylene diisocyanate, etc.

{Modified Copolymer}

In the polymerization step, an unmodified block copolymer (P) may be obtained as described above, but a modified block copolymer (P) may also be obtained as follows.

Prior to the hydrogenation step to be mentioned below, the block copolymer (P) may be modified. Examples of the functional group that may be introduced into the copolymer include an amino group, an alkoxysilyl group, a hydroxyl group, an epoxy group, a carboxyl group, a carbonyl group, a mercapto group, an isocyanate group, an acid anhydride, etc.

Example of the modification method for the block copolymer include a method of adding a coupling agent capable of reacting with a polymerization active terminal, such as tetrachlorotin, tetrachlorosilane, dichlorodimethylsilane, dimethyldiethoxysilane, tetramethoxysilane, tetraethoxysilane, 3-aminopropyltriethoxysilane, tetraglycidyl-1,3-bisaminomethylcyclohexane, 2,4-tolylene diisocyanate, etc., or a polymerization terminal modifier such as 4,4'-bis(diethylamino)benzophenone, N-vinylpyrrolidone, etc., or any other modifier as described in JP 2011-132298 A, prior to addition of a polymerization terminator. Alternatively, after isolation of the copolymer, it may be grafted with a maleic anhydride, etc.

The position to which the functional group is introduced may be the polymerization terminal of the block copolymer (P), or may also be the side chain thereof. One or more of the above-mentioned functional groups may be used optionally as combined. Preferably, the modifier is used in an amount falling within a range of 0.01 to 10 molar equivalents relative to the anionic polymerization initiator.

<Hydrogenation Step>

In a step of hydrogenating the block copolymer (P) obtained in the above-mentioned process, a hydrogenated block copolymer (HP) can be obtained. Any known method is employable as the hydrogenation process. For example, the block copolymer (P) is dissolved in a solvent not having any influence on hydrogenation to prepare a solution thereof, and hydrogenated in the presence of a Ziegler catalyst, or a nickel, platinum, palladium, ruthenium or rhodium metal catalyst supported by carbon, silica, diatomaceous earth or the like, or an organic metal complex having a cobalt, nickel, palladium, rhodium or ruthenium metal or the like serving as a hydrogenation catalyst. In the hydrogenation step, the hydrogenation catalyst may be added to a polymerization reaction solution containing the block copolymer (P) obtained according to the above-mentioned production method for the block copolymer (P) so as to hydrogenate the copolymer. In the present invention, palladium-carbon where palladium is supported by carbon is preferably used.

In the hydrogenation, the hydrogen pressure is preferably 0.1 to 20 MPa, the reaction temperature is preferably 100 to 200° C., and the reaction time is preferably 1 to 20 hours.

The hydrogenation rate of the carbon-carbon double bond in the polymer block (B) and the polymer block (C) in the hydrogenated block copolymer (HP) is, from the viewpoint of obtaining the hydrogenated block copolymer (HP) having excellent heat resistance and weather resistance, preferably 50 mol % or more, more preferably 70 mol % or more, even more preferably 90 mol % or more. The hydrogenation rate can be calculated according to the process described in the section of Examples to be given below.

[Hydrogenated Block Copolymer Composition]

The hydrogenated copolymer composition of the present invention contains the hydrogenated block copolymer of the present invention and at least one selected from a polyolefin resin, a tackifier resin, and a softening agent. The hydrogenated block copolymer composition of the present invention has excellent molding processability as containing the hydrogenated block copolymer of the present invention. In this description, the hydrogenated block copolymer composition of the present invention may also be referred to as "a thermoplastic elastomer composition".

The content of the hydrogenated block copolymer in the hydrogenated block copolymer composition of the present invention is, from the viewpoint of molding processability, preferably 1 to 99% by mass.

<Polyolefin Resin>

Preferred examples of the polyolefin resin include polyethylene, polypropylene, polybutene-1, polyhexene-1, poly-3-methyl-butene-1, poly-4-methyl-pentene-1, a copolymer of ethylene with one or more α-olefins having 3 to 20 carbon atoms (e.g., propylene, 1-butene, 1-pentene, 1-hexene, 1-heptene, 1-octene, 1-decene, 3-methyl-1-butene, 4-methyl-1-pentene, 6-methyl-1-heptene, isooctene, isooctadiene, decadiene, etc.), an ethylene/propylene/diene copolymer (EPDM), an ethylene-propylene copolymer, an ethylene-vinyl acetate copolymer, etc.

The polyolefin resin may also be a polar group-containing polyolefin polymer. Examples of the polar group in the polar group-containing polyolefin polymer include a polar group derived from vinyl acetate, vinyl chloride, ethylene oxide, propylene oxide, acrylamide, an unsaturated carboxylic acid or an ester or an acid anhydride thereof.

Above all, a polar group derived from an unsaturated carboxylic acid or an ester or an acid anhydride thereof is preferred. The unsaturated carboxylic acid or the ester or acid anhydride thereof include (meth)acrylic acid, (meth)acrylates, maleic acid, maleic anhydride, fumaric acid, itaconic acid, itaconic anhydride, himic acid, himic anhydride, etc. The polar group-containing polyolefin polymer may contain one or more of these polar groups.

A method for obtaining the polar group-containing polyolefin polymer is not specifically limited. For example, those obtained by reacting and modifying a commercial polyolefin product with a polar group-containing compound, those obtained by a random copolymerization, a block copolymerization or a graft copolymerization of an olefin with a polar group-containing copolymerizable monomer in any known mode, or those obtained by oxidizing or chlorinating a polyolefin resin according to a known method may be used.

Examples of the copolymer of an olefin and a polar group-containing copolymerizable monomer include an ethylene-methyl (meth)acrylate copolymer, an ethylene-ethyl (meth)acrylate copolymer, an ethylene-(meth)acrylic acid copolymer, a metal ion-crosslinked resin (ionomer) of an ethylene-(meth)acrylic acid copolymer, etc.

In the hydrogenated block copolymer composition of the present invention, the ratio by mass of the hydrogenated block copolymer to the polyolefin resin [hydrogenated block copolymer/polyolefin resin] is preferably 10/90 to 96/56, more preferably 30/70 to 95/5, even more preferably 40/60 to 90/10.

<Tackifier Resin>

Examples of the tackifier resin include a rosin resin, a terpene-phenol resin, a terpene resin, an aromatic hydrocarbon-modified terpene resin, an aliphatic petroleum resin, an alicyclic petroleum resin, an aromatic hydrocarbon resin, a chromane-indene resin, a phenolic resin, a xylene resin or hydrogenates thereof, etc. One alone or two or more kinds of these tackifier resins may be used either singly or as combined.

The softening pint of the tackifier resin is, from the viewpoint of molding processability, preferably 85 to 160° C., more preferably 100 to 150° C., even more preferably 105 to 146° C.

In the hydrogenated block copolymer composition of the present invention, the ratio by mass of the hydrogenated block copolymer to the tackifier resin [hydrogenated block copolymer/tackifier resin] is preferably 10/90 to 95/5, more preferably 30/70 to 95/5, even more preferably 40/60 to 90/10.

<Softening Agent>

As the softening agent, any known softening agent is employable, and examples thereof include paraffinic, naphthenic, aromatic and the like hydrocarbon oils; vegetable oils such as peanut oil, rosin, etc.; phosphates; low-molecular-weight polyethylene glycols; liquid paraffins; hydrocarbon-type synthetic oils such as low-molecular-weight polyethylenes, ethylene-α-olefin copolymerization oligomers, liquid polybutenes, liquid polyisoprenes or hydrogenates thereof, liquid polybutadienes or hydrogenates thereof, etc. One alone or two or more kinds of these may be used either singly or as combined. Above all, as the softening agent, a hydrocarbon oil such as a paraffin oil, or a synthetic hydrocarbon oil such as an ethylene-α-olefin copolymerization oligomer or the like is preferably used.

The kinematic viscosity at 40° C. of the softening agent is, from the viewpoint of molding processability, preferably 5 to 1,000 mm$^2$/s, more preferably 5 to 800 mm$^2$/s, even more preferably 30 to 600 mm$^2$/s.

In the hydrogenated block copolymer composition of the present invention, the ratio by mass of the hydrogenated block copolymer to the softening agent [hydrogenated block copolymer/softening agent] is preferably 5/95 to 95/5, more preferably 10/90 to 90/10, even more preferably 20/80 to 90/10.

The hydrogenated block copolymer composition of the present invention can be used as an oil gel, and in this case, the ratio by mass of the hydrogenated block copolymer to the softening agent [hydrogenated block copolymer/softening agent] is preferably 5/95 to 95/5, more preferably 10/90 to 95/5, even more preferably 20/80 to 95/5.

<Other Resin>

The hydrogenated block copolymer composition of the present invention may contain any other resin within a range not detracting from the object of the present invention. The other resin includes a conjugated dienic resin such as polyisoprene, polybutadiene, styrene-butadiene rubber, styrene-isoprene rubber, etc.; a styrenic resin such as polystyrene, AS resin, ABS resin, etc.; a polyphenylene ether resin; a polyamide resin such as nylon 6, nylon 66, etc.; a polyester resin such as polyethylene terephthalate, polybutylene terephthalate, etc.; a polyurethane resin; an acetal resin such as polyvinyl acetal, polyoxymethylene homopolymer, polyoxymethylene copolymer, etc.; an acrylic resin such as polymethyl methacrylate resin, etc.

<Other Hydrogenated Block Copolymer.

The hydrogenated block copolymer composition of the present invention may contain any other hydrogenated block copolymer than the hydrogenated block copolymer of the present invention.

Examples of the other hydrogenated block copolymer include a hydrogenated block copolymer prepared by hydrogenating a block copolymer that contains the above-mentioned polymer block (A) containing a structural unit derived from an aromatic vinyl compound, and a polymer block (C) containing a structural unit derived from a conjugated diene except farnesene. Preferred embodiments of the polymer block (A), the polymer block (C) and the hydrogenation rate are the same as those of the polymer blocks and the hydrogenation rate of the hydrogenated block copolymer of the present invention.

In the case where the hydrogenated block copolymer composition of the present invention contains any other hydrogenated block copolymer, the content thereof is preferably 100 parts by mass or less relative to 100 parts by mass of the hydrogenated block copolymer of the present invention.

[Molded Article]

The molded article of the present invention uses the hydrogenated block copolymer of the present invention or the hydrogenated block copolymer composition of the present invention.

Examples of the shape of the molded article include pellets, sheets, plates, pipes, tubes, rods, granules, etc. A method for producing the molded article is not specifically limited, and examples thereof include various molding methods heretofore known in the art of injection molding, blow molding, press molding, extrusion molding, calender molding, etc. The hydrogenated block copolymer and the hydrogenated block copolymer composition of the present invention are excellent in molding processability, and therefore can be favorably molded into molded articles through high-cycle injection molding.

[Laminate]

The laminate of the present invention contains a layer using the hydrogenated block copolymer of the present invention or the hydrogenated block copolymer composition of the present invention.

The shape of the laminate is not specifically limited, and examples thereof include films, sheets, tubes, etc. Above all, a filmy laminate is preferred.

The laminate of the present invention can be obtained, for example, by laminating a film using the hydrogenated block copolymer of the present invention or the hydrogenated block copolymer composition of the present invention and a layer of any other resin.

Examples of the other resin include a polyolefin resin, a polyester resin, a polyamide resin, an acrylic resin, a polyoxymethylene resin, a styrene resin, a polycarbonate resin, a natural rubber, a chloroprene rubber, an acrylic rubber, a butyl rubber, an acrylonitrile-butadiene rubber, an urethane rubber. Examples of the polyolefin resin include polypropylene (homopropylene, block propylene, random propylene), propylene-ethylene copolymer, low-density polyethylene, linear low-density polyethylene, high-density polyethylene, ethylene-α-olefin copolymer. Examples of the polyester resin include polyethylene terephthalate (PET).

The laminate of the present invention may be a laminate of a layer using the hydrogenated block copolymer of the present invention or the hydrogenated block copolymer composition of the present invention, and a layer of a fabric. The method for producing the laminate in this case is not specifically limited. For example, employing a molding method accompanied by melting, for example, an injection molding method such as an insert injection molding method, a dichromic injection molding method, a sandwich injection molding method, etc.; an extrusion molding method such as a T-die laminate molding method, a coextrusion molding method, an extrusion coating method, etc., or a calender molding method, a press molding method, or a compression molding method, a sheet of the hydrogenated block copolymer composition is produced, and this is laminated with a fabric and molded according to a compression molding method to produce a laminate.

The kind of the material of the fabric is not specifically limited, and examples thereof include a woven fabric, a knitted fabric, a felt, a nonwoven fabric, etc.

The material of the fabric may be a natural fiber or a synthetic fiber, or a mixture of a natural fiber and a synthetic fiber. Examples of the natural fiber include one or more selected from cotton, silk, hemp, and wool.

The synthetic fiber is preferably at least one selected from a polyester fiber, an acrylic fiber (polyacrylonitrile), a polyurethane fiber, a polyamide fiber, a polyolefin fiber and a vinylon fiber. The polyamide fiber includes nylon 6, nylon 6.6, etc. The polyolefin fiber includes polyethylene fiber, polypropylene fiber, etc.

However, from the viewpoint of expecting a further effect of improving adhesive force, the fabric preferably includes a natural fiber in an amount of 10% by mass or more, more preferably 20% by mass or more, even more preferably 30% by mass or more, still more preferably 40% by mass or more, and further more preferably 70% by mass or more, especially preferably 80% by mass or more, and most preferably 90% by mass or more.

The laminate of the present invention may be formed of 2 layers of a layer using the hydrogenated block copolymer of the present invention or the hydrogenated block copolymer composition of the present invention (hereinafter referred to as "layer (1)") and a layer of fabric (hereinafter referred to as "fabric (2)") alone, or may be formed of three or more layers of these. The case where the laminate is formed of three or more layers of the above includes layer structures of "layer (1)/fabric (2)/layer (1)", "layer (1)/layer (1)/fabric (2)" where the two layers (1) are composed of different components), etc.

Further, the laminate of the present invention may have any other layer (3) than the above-mentioned layer (1) and fabric (2). In the case where the laminate has the other layer (3), the layer (3) may be on the layer (1), or may be on the fabric (2), but from the viewpoint that the laminate could have the fabric (2) as the surface layer, it is preferable that the other layer (3) is on the layer (1), that is, the laminate of the type has a layer structure of "fabric (2)/layer (1)/layer (3)".

The other layer (3) may be formed of one layer, or may be formed of two or more layers.

The components of the other layer (3) are not specifically limited, and examples thereof include thermoplastic resins, various metals, various leathers, various glasses, various woods, etc. Above all, use of thermoplastic resins and various leathers is preferred.

In the laminate of the present invention, a foaming agent may be added to the layer (1) to foam it. Examples of the foaming agent to be used in this case include an inorganic foaming agent such as ammonium carbonate, ammonium hydrogencarbonate, sodium hydrogencarbonate, ammonium nitrite, sodium borohydride, asides, etc.; an organic foaming agent, for example, a N-nitroso compound such as N,N'-dinitrosopentamethylenetetramine, N,N'-dimethyl-N,N'-dinitrosoterephthalamide, etc.; an azo compound such as azobisisobutyronitrile, azodicarbonamide, barium azodicarboxylate, etc.; an alkane fluoride such as trichloromonofluoromethane, dichloromonofluoromethane, etc.; a sulfonylhydrazine compound such as paratoluenesulfonyl hydrazide, diphenylsulfone-3,3'-disulfonyl hydrazide, 4,4'-oxybis(benzensulfonylhydrazide), allylbis(sulfonylhydrazide), etc.; a sulfonylsemicarbazide compound such as p-toluylenesulfonylsemicarbazide, 4,4'-oxybis(benzenesulfonylsemicarbazide), etc.; a triazole compound such as 5-morpholyl-1,2,3,4-thiatriazole, etc.; thermoexpansible fine particles prepared by encapsulating a thermoexpansible compound such as isobutene, pentane or the like in a microcapsule formed of a thermoplastic resin such as vinylidene chloride, acrylonitrile, acrylate, methacrylate or the like, etc.

Commercial products of thermoexpansible fine particles include "Microsphere" (trade name, epoxy resin encapsulated microcapsules) manufactured by Matsumoto Yushi-Seiyaku Co., Ltd., "Fillite" (trade name, inorganic microballoons) manufactured by Japan Fillite Co., Ltd., "EXPANCEL" (trade name, organic microballoons) manufactured by Akzo Nobel, etc. Among the above-mentioned foaming agents, an inorganic foaming agent, an azo compound and a sulfonylhydrazine compound are preferred from the viewpoint of safety to human bodies. One alone or two or more kinds of these may be used either singly or as combined.

In the case where a foaming agent is used, the content thereof is preferably 0.1 to 3.0% by mass relative to the total mass of the hydrogenated block copolymer composition, more preferably 0.3 to 2.8% by mass. When the content of the foaming agent is less than 0.1% by mass, the expansion ratio of the molded foam would be insufficient and the rubber elasticity thereof would be poor, but when more than 3.0% by mass, the foaming cells would grow too much and a molded article having adequate closed foam cells could not be obtained.

A foaming method in the case of using a foaming agent is not specifically limited. A chemical foaming method by decomposition or reaction of a foaming agent, or a combination of the chemical method and a physical method of supercritical foaming or aqueous foaming may be employed.

The laminate of the present invention may be used as a laminate that uses a layer formed of the hydrogenated block copolymer or the hydrogenated block copolymer composition of the present invention as an adhesive layer and uses a layer of any other resin as a substrate layer.

The substrate layer is not specifically limited, but from the viewpoint of the performance and the cost of the laminate, an olefin resin or a polyester resin is preferred.

The configuration of the substrate layer may be a single-layer configuration of one layer or a multilayer configuration of two or more layers. In the case of the configuration of two or more layers, two or more different kinds of resins may be used.

The thickness of the substrate layer is preferably 500 μm or less, more preferably 200 μm or less, even more preferably 100 μm or less.

The layer of the other resin may optionally contain, as further added thereto within a range not detracting from the object of the present invention, additives, for example, a heat stabilizer, a light stabilizer, a UV absorbent, an antioxidant, a lubricant, a colorant, an antistatic agent, a flame retardant, a water repellent, a waterproofing agent, a hydrophilizing agent, a conductivity imparting agent, a thermal conductivity imparting agent, an electromagnetic wave shieldability imparting agent, a transparency regulator, a fluorescent agent, a slidability imparting agent, a transparency imparting agent, an antiblocking agent, a metal inactivator, a microbicide, etc.

A production method for the laminate of the present invention is not specifically limited, and for example, a coextrusion molding method such as a multilayer T-die method, a multilayer inflation method, an extrusion lamination method, etc.; an ordinary multilayer sheet or film molding method of wet lamination, dry lamination, press molding, etc.; a blow molding method such as a multilayer injection blow, for example a coinjeciton blow or the like and a multilayer direct blow, etc.; a calender molding method, etc. can be employed. The molded laminate may be used while unstretched or after monoaxially or biaxially stretched. Namely, the hydrogenated block copolymer or the hydrogenated block copolymer composition of the present invention may be laminated on a substrate layer according to a coextrusion T-die method, an inflation method, a lamination method, a solvent coating method or a calendering molding method to produce the laminate of the present invention.

The method of extruding a hydrogenated block copolymer or a hydrogenated block copolymer composition as well as a substrate that has been melted by heating through a T-die according to a coextrusion T-die method or a lamination method includes a feed-block method (single manifold method), a multi-manifold method, etc.

In the case where the laminate is produced by solvent coating, the hydrogenated block copolymer of the present invention or the hydrogenated block copolymer composition of the present invention is dissolved in an organic solvent to prepare a solution thereof, and the resultant solution is applied onto a substrate layer and then dried to give the laminate.

Examples of the organic solvent include, though not specifically limited thereto, cyclohexane, methylcyclohexane, n-hexane, n-heptane, benzene, toluene, toluene-ethanol mixed solvent, xylene, ethylbenzene, tetrahydrofuran, etc. One alone or two or more kinds of these solvents may be used either singly or as combined.

In the case where the laminate is produced by solvent coating, the concentration of the hydrogenated block copolymer of the present invention or the hydrogenated block copolymer composition of the present invention in the solution thereof is, from the viewpoint of easiness in coating, easiness in solution production and easiness in drying, preferably 5 to 50% by mass, more preferably 5 to 40% by mass, even more preferably 5 to 30% by mass.

In the case where the hydrogenated block copolymer composition of the present invention is used in the laminate and where the hydrogenated block copolymer composition contains a polyolefin resin, the ratio by mass of the hydrogenated block copolymer to the polyolefin resin [hydrogenated block copolymer/polyolefin resin] is preferably 1.0/90 to 90/10, more preferably 20/80 to 90/10. In the case where the composition contains a tackifier resin, the ratio by mass of the hydrogenated block copolymer to the tackifier resin [hydrogenated block copolymer/tackifier resin] is preferably 40/60 to 95/5, more preferably 60/40 to 95/5. Further, when the composition contains a softening agent, the ratio by mass of the hydrogenated block copolymer to the softening agent [hydrogenated block copolymer/softening agent] is preferably 30/70 to 95/5, more preferably 50/50 to 90/10.

[Film]

The film of the present invention is one using the hydrogenated block copolymer of the present invention or the hydrogenated block copolymer composition of the present invention, and is one formed of a single layer.

The film of the present invention can be produced in various methods, and the shape thereof is not specifically limited. The molding method includes, for example, blow molding, press molding, extrusion molding, as well as other various molding methods listed for the production method for the laminate described hereinabove.

In the case where the hydrogenated block copolymer composition of the present invention is used for the film and where the hydrogenated block copolymer composition contains a polyolefin resin, the ratio by mass of the hydrogenated block copolymer to the polyolefin resin [hydrogenated block copolymer/polyolefin resin] is preferably 10/90 to 90/10, more preferably 20/80 to 90/10. In the case where the composition contains a tackifier resin, the ratio by mass of the hydrogenated block copolymer to the tackifier resin [hydrogenated block copolymer/tackifier resin] is preferably 40/60 to 95/5, more preferably 60/40 to 95/5. Further, when the composition contains a softening agent, the ratio by mass of the hydrogenated block copolymer to the softening agent [hydrogenated block copolymer/softening agent] is preferably 30/70 to 95/5, more preferably 50/50 to 90/10.

[Protective Film]

The protective film of the present invention contains the laminate of the present invention or the film of the present invention. As needed, the protective film may be provided in the form of a film with a release liner attached to the adhesive surface thereof (in the form of a release liner-attached protective film) for the purpose of protecting the adhesive surface (the side of the adhesive layer to be adhered to an adherend).

As the release liner, paper, a synthetic resin film or the like is usable, and from the viewpoint of excellent surface smoothness, a synthetic resin film is favorably used. The thickness of the release liner may be, for example, 5 μm to 200 μm, and is preferably 10 μm to 100 μm. The surface of the release liner to be attached to the adhesive layer may be processed for release or antifouling treatment using any known conventional release agent (for example, silicone agent, fluorine-containing agent, long-chain alkyl-having agent, fatty acid amide agent, etc.) or a silica power, etc.

In the case where the hydrogenated block copolymer composition of the present invention is used in the protective film and where the hydrogenated block copolymer composition contains a polyolefin rein, the ratio by mass of the hydrogenated block copolymer to the polyolefin resin [hydrogenated block copolymer/polyolefin resin] is preferably 50/50 to 95/5, more preferably 70/30 to 90/10. In the case where the composition contains a tackifier resin, the ratio by mass of the hydrogenated block copolymer to the tackifier resin [hydrogenated block copolymer/tackifier resin] is preferably 50/50 to 95/5, more preferably 70/30 to 95/5. Further, when the composition contains a softening agent, the ratio by mass of the hydrogenated block copolymer to the softening agent [hydrogenated block copolymer/softening agent] is preferably 60/40 to 95/5, more preferably 70/30 to 90/10.

[Fiber, Nonwoven Fabric]

The fiber and the nonwoven fabric of the present invention are ones using the hydrogenated block copolymer of the present invention or the hydrogenated block copolymer composition of the present invention.

A method for producing the fiber and the nonwoven fabric of the present invention is not specifically limited, but from the viewpoint of the strength of fiber and nonwoven fabric, from the compactness of nonwoven fabric, and from quality and cost, a melt blowing method or a spun bonding method is preferred, and form the viewpoint of fine fiber formation, thin film formation and compactness of nonwoven fabric, a melt blowing method is more preferred.

On the other hand, from the viewpoint of high uniformity (weight unevenness, opening), air permeability, small fluffing, difficult snagging at cut end, and productivity, a spun bonding method is preferred.

In the case where the hydrogenated block copolymer composition is used in the fiber or the nonwoven fabric and in the case where the hydrogenated block copolymer composition contains a polyolefin resin, the ratio by mass of the hydrogenated block copolymer to the polyolefin resin [hydrogenated block copolymer/polyolefin resin] is preferably 30/70 to 95/5, more preferably 40/60 to 90/10. In the case where the composition contains a tackifier resin, the ratio by mass of the hydrogenated block copolymer to the tackifier resin [hydrogenated block copolymer/tackifier resin] is preferably 30170 to 95/5, more preferably 40/60 to 90/10. Further, when the composition contains a softening agent, the ratio by mass of the hydrogenated block copolymer to the softening agent [hydrogenated block copolymer/softening agent] is preferably 20/80 to 95/5, more preferably 30/70 to 90/10.

In the case where the fiber or the nonwoven fabric of the present invention are used in applications where elastic performance is required, and where the hydrogenated block copolymer composition contains a polyolefin resin, the ratio by mass of the hydrogenated block copolymer to the polyolefin resin [hydrogenated block copolymer/polyolefin resin] is preferably 30/70 to 95/5, more preferably 40/60 to 90/10. In the case where the polyolefin resin-containing nonwoven fabric is required to have an improved touch feeling, [hydrogenated block copolymer/polyolefin resin] is preferably 5/95 to 50/50, more preferably 10/90 to 30/70.

In the nonwoven fabric of the present invention, the fiber diameter of the constituent fiber of the nonwoven fabric is preferably less than 100 μm, more preferably 3 to 30 μm, even more preferably 5 to 20 μm, still more preferably 7 to 15 μm. When the fiber diameter is 3 μm or more, fiber cutting can be prevented during spinning, and when less than 3 μm, the compactness and the strength of the resultant nonwoven fabric may be insufficient.

The basis weight of the nonwoven fabric is preferably 5 to 1000 g/m², more preferably 10 to 500 g/m². When the basis weight is 6 g/m² or more, a nonwoven fabric having a high strength can be obtained, and when 1000 g/m² or less, low cost production of nonwoven fabric is possible.

The thickness of the nonwoven fabric is preferably 0.01 to 1.0 mm, more preferably 0.05 to 0.8 mm. When the thickness is 0.01 mm or more, a nonwoven fabric having a high strength can be obtained, and when 1.0 mm or less, a nonwoven fabric having high flexibility and excellent in handleability can be obtained.

[Decorative Molding Material]

The decorative molding material of the present invention contains the laminate, the film, the fiber or the nonwoven fabric of the present invention.

The thickness of the decorative molding material of the present invention can be adequately controlled, but from the viewpoint of the strength and the adhesive force of the decorative molding material, the thickness thereof is preferably 10 to 1,000 μm.

The decorative molding material of the present invention is excellent in molding processability and is therefore, for example, by molding it using a known press-molding machine, a decorative molded article can be produced with ease. As a method for producing a decorative molded article, for example, there is mentioned a method of heating the upper die and the lower die of a molding machine up to 80 to 180° C., then charging the decorative molding material of the present invention and a thermosetting molding material in layers on the lower die, closing the mold, and hot press-molding it under a pressure of 10 to 120 kg/cm² for 30 seconds to 20 minutes to cure the resin, and thereafter demolding the resultant decorative molded article.

Alternatively, a method of also employable where the decorative molding material of the present invention is pre-molded along the inside shape of a mold so as to adhering it to the inner surface of the mold, and thereafter an injection resin is injected into the mold to produce a decorative molded article.

[Adhesive]

The adhesive of the present invention uses the hydrogenated block copolymer of the present invention or the hydrogenated block copolymer composition of the present invention.

The amount to be applied to an adherend may be suitably defined in accordance with various conditions such as the kind of the adherend, the adhering atmosphere (temperature, humidity, etc.), etc. As a method for applying the adhesive of the present invention to an adherend, for example, there is mentioned a method of applying a solution prepared by dissolving the adhesive in an organic solvent to an adherend by a brush or a roll (solution coating), or a method of melting the adhesive under heat and applying it to an adherend with a hot gun or the like (hot melt coating), etc.

In the case where the hydrogenated block copolymer composition of the present invention is used as an adhesive and where the hydrogenated block copolymer composition contains a polyolefin rein, the ratio by mass of the hydrogenated block copolymer to the polyolefin resin [hydrogenated block copolymer/polyolefin resin] is preferably 40/60 to 95/5, more preferably 50/50 to 90/10. In the case where a tackifier resin is contained in the composition, the ratio by mass of the hydrogenated block copolymer to the tackifier resin [hydrogenated block copolymer/tackifier resin] is preferably 10/90 to 95/5, more preferably 30/70 to 90/10. Further, in the case where a softening agent is contained, the ratio by mass of the hydrogenated block copolymer to the softening agent [hydrogenated block copolymer/softening agent] is preferably 10190 to 90/10, more preferably 20/80 to 80/20.

[Modeling Material]

The hydrogenated block copolymer composition of the present invention can also be used as a modeling material. Specifically, the composition can be favorably used as a hot-melt lamination-type three-dimensional modeling material, that is, a material for so-called 3D printing.

The shape of the modeling material is not specifically limited, including filaments, pellets, powder, etc.

Filaments for a hot-melt lamination-type three-dimensional modeling machine (3D printer) are generally obtained through known extrusion molding, and the thickness of the filament may be freely controlled so as to be applicable to the 3D printer to be used. In general, filaments having a diameter of 1.5 to 2.0 mm are favorably used.

[Elastic Member]

The elastic member of this embodiment is an elastic member produced by molding a thermoplastic elastomer composition containing a hydrogenated block copolymer (I), wherein:

the hydrogenated block copolymer (I) is a hydrogenate of a block copolymer (P) containing:

a polymer block (a) containing a structural unit derived from an aromatic vinyl compound, a polymer block (b) containing 1 to 100% by mass of a farnesene-derived structural unit (b1) and 99 to 0% by mass of a structural unit derived from a conjugated diene except farnesene, and a polymer block (c) having a content of the farnesene-derived structural unit (b1) of less than 1% by mass and a content of the structural unit (b2) derived from a conjugated diene except farnesene of 1 to 100% by mass, and containing at least two above polymer blocks (a), at least one above polymer block (b) and at least one above polymer block (c), wherein at least one above polymer block (b) exists at the terminal, and wherein:

the ratio by mass of the above polymer block (a) to the above polymer block (b) [(a)/(b)] is 1/99 to 70/30, the ratio by mass of the above polymer block (a) to the total of the above polymer block (b) and the above polymer block (c) [(a)/((b)+(c))] is 1/99 to 70/30, 50 mol % or more of the total of the carbon-carbon double bond derived from farnesene and the carbon-carbon double bond derived from a conjugated diene except farnesene existing in the block copolymer (P) have been hydrogenated, and wherein:

the hysteresis loss rate in one cycle of deformation and restoration of a specimen is 20% or less, the specimen being prepared by blanking a 0.5 mm-thick sheet formed by compression molding of the thermoplastic elastomer composition at 240° C. and under a load of 10 MPa for 3 minutes into a strip specimen having a width of 25 mm and a length of 150 mm, where the specimen is 100% expanded at a temperature of 23° C. and then shrunk in the cycle of deformation and restoration of the specimen.

<Thermoplastic Elastomer Composition>

The thermoplastic elastomer composition of this embodiment contains the hydrogenated block copolymer (I).

The thermoplastic elastomer composition of this embodiment may contain any other optional component than the hydrogenated block copolymer (I).

Examples of the optional component include a polystyrene resin (II), a softening agent (II), etc.

[Hydrogenated Block Copolymer (I)]

The hydrogenated block copolymer (I) of this embodiment is a hydrogenate of a block copolymer (P) containing:

a polymer block (a) containing a structural unit derived from an aromatic vinyl compound, a polymer block (b) containing 1 to 100% by mass of a farnesene-derived structural unit (b1) and 99 to 0% by mass of a structural unit derived from a conjugated diene except farnesene, and a polymer block (c) having a content of the farnesene-derived structural unit (b1) of less than 1% by mass and a content of the structural unit (b2) derived from a conjugated diene except farnesene of 1 to 100% by mass, and containing at least two above polymer blocks (a), at least one above polymer block (b) and at least one above polymer block (c), wherein at least one above polymer block (b) exists at the terminal, and wherein:

the ratio by mass of the above polymer block (a) to the above polymer block (b) [(a)/(b)] is 1/99 to 70/30, the ratio by mass of the above polymer block (a) to the total of the above polymer block (b) and the above polymer block (c) [(a)/((b)+(c))] is 1/99 to 70/30, 50 mol % or more of the total of the carbon-carbon double bond derived from farnesene and the carbon-carbon double bond derived from a conjugated diene except farnesene existing in the block copolymer (P) have been hydrogenated.

The polymer block (a) contains a structural unit derived from an aromatic vinyl compound.

Examples of the aromatic vinyl compound include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. These aromatic vinyl compounds may be used alone or in combination of any two or more thereof. Above all, preferred are styrene, α-methylstyrene and 4-methyl styrene, and more preferred is styrene.

The polymer block (a) may contain, as a minor unit or an impurity unit, any other structural unit than the structural unit derived from an aromatic vinyl compound, to a degree not detracting from the advantageous effects of the present invention, but preferably does not contain the additional unit.

The content of the other structural unit in the polymer block (a) is preferably 10% by mass or less, more preferably 5% by mass or less, even more preferably 1% by mass or less.

The content of the structural unit derived from an aromatic vinyl compound in the polymer block (a) is preferably 90% by mass or more, more preferably 95% by mass or more, even more preferably 99% by mass or more.

The peak top molecular weight (Mp) of the polymer block (a) is, from the viewpoint of molding processability, preferably 1,000 to 200,000, more preferably 5,000 to 150,000, even more preferably 6,000 to 100,000, still more preferably 7,000 to 60,000. The peak top molecular weight (Mp) in this description means a value measured according to the method described in the section of Examples to be given below.

The polymer block (b) contains a farnesene-derived structural unit (b1) in an amount of 1 to 100% by mass and contains a structural unit (b2) derived from a conjugated diene except farnesene in an amount of 99 to 0% by mass. The structural unit (b1) may be a structural unit derived from either α-farnesene or β-farnesene represented by the following formula (I). However, from the viewpoint of facilitated production of the block copolymer (P), a β-farnesene-derived structural unit is preferred. Meanwhile, α-farnesene and β-farnesene may be used as combined.

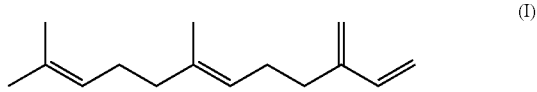

(I)

Examples of the conjugated diene to constitute the structural unit (b2) derived from a conjugated diene except farnesene include butadiene, isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. These may be used alone or in combination of any two or more thereof. Above all, at least one selected form butadiene, isoprene and myrcene is preferred, butadiene and/or isoprene is more preferred, and butadiene is most preferred.

The polymer block (b) contains a farnesene-derived structural unit (b1) in an amount of 1 to 100% by mass and contains a structural unit (b2) derived from a conjugated diene except farnesene in an amount of 99 to 0% by mass. Here, "containing 0% by mass of the structural unit (b2)" means that the polymer block does not contain the structural unit (b2).

When the content of the farnesene-derived structural unit (b1) in the polymer block (b) ((b1)/(b)) is less than 1% by mass, an elastic member excellent in elasticity restoration could not be obtained. The content of the structural unit (b1) in the polymer block (b) is preferably 30 to 1.00% by mass, more preferably 45 to 100% by mass, even more preferably 50 to 100% by mass, still more preferably 55 to 100% by mass, and for example, the content is preferably 100% by mass (that is, the polymer block (b) is composed of the structural unit (b1) alone).

In the case where the polymer block (b) contains the structural unit (b2) derived from a conjugated diene except farnesene, the content of the structural unit (b2) is preferably 70% by mass or less, more preferably 65% by mass or less, even more preferably 50% by mass or less, still more preferably 45% by mass or less.

The total content of the structural unit (b1) and the structural unit (b2) in the polymer block (b) is preferably 80% by mass or more, more preferably 90% by mass or more, even more preferably 95% by mass or more, still more preferably 99% by mass or more, and further more preferably 100% by mass.

The block copolymer (P) contains, in addition to the above-mentioned polymer block (a) and the polymer block (b), a polymer block (c) having a content of the farnesene-derived structural unit (b1) of less than 1% by mass and a content of the structural unit (b2) derived from a conjugated diene except farnesene of 1 to 100% by mass.

The component of farnesene for the structural unit (b1) and the component of a conjugated diene for (b2) are as described above.

Containing the polymer block (c) in addition to the above-mentioned polymer block (b), the composition has an advantage of excellent molding processability.

Here, "the content of the farnesene-derived structural unit (b1) is less than 1% by mass" in the polymer block (c) includes a case where the content of the structural unit (b1) is 0% by mass, that is, the polymer block does not contain the structural unit (b1). The content of the structural unit (b1) is preferably 0% by mass.

The content of the structural unit (b2) in the polymer block (c) is preferably 60 to 100% by mass, more preferably 80 to 100% by mass, even more preferably 90 to 100% by mass, further more preferably more than 99% by mass and up to 100% by mass, still further more preferably 100% by mass.

The total content of the structural unit (b1) and the structural unit (b2) in the polymer block (c) is preferably 80% by mass or more, more preferably 90% by mass or more, even more preferably 95% by mass or more, still more preferably 99% by mass or more, and further more preferably 100% by mass.

The bonding mode for plural polymer blocks is not specifically limited, and may be linear, branched, radial or a combination of two or more of these. Above all, a mode of bonding the blocks linearly to each other is preferred.

The hydrogenated block copolymer (I) of this embodiment contains the polymer block (a), the polymer block (b) and the polymer block (c), and preferably has a structure having the blocks of the polymer block (b), the polymer block (a) and the polymer block (c) in that order. Specifically, when the polymer block (a) is represented by a, the polymer block (b) is by b and the polymer block (c) is by c, a penta-block copolymer represented by b-a-c-a-b, a tetra-block copolymer represented by b-a-c-a, and those of b-a-(c-a)$_l$-b, b-a-(c-a-b)$_m$ or b-a-(c-a-b)$_n$ (where l, m and n each independently represent an integer of 2 or more) are preferred, and a penta-block copolymer represented by b-a-c-a-b is more preferred.

In the case where the block copolymer (P) contains two or more polymer blocks (a), two or more polymer blocks (b) or two or more (c), each polymer block may be a polymer block composed of the same structural unit or may be a polymer block composed of different structural units.

The ratio by mass of the polymer block (a) to the polymer block (b) [(a)/(b)] in the block copolymer (P) is 1/99 to 70/30. When the ratio falls within the range, an elastic member excellent in elasticity restoration can be obtained. From this viewpoint, the ratio by mass of the polymer block (a) to the polymer block (b) [(a)/(b)] is preferably 1/99 to 60/40, more preferably 10/90 to 55/45, even more preferably 10/90 to 50/50, still more preferably 15/85 to 50/50.

The ratio by mass of the polymer (a) to the total of the polymer block (b) and the polymer block (c) [(a)/((b)+(c))] in the block copolymer (P) is preferably 1/99 to 70/30. When the ratio falls within the range, an elastic member excellent in elasticity restoration can be obtained. From this viewpoint, the ratio by mass [(a)/((b)+(c))] is preferably 1/99 to 60/40, more preferably 10/90 to 40/60, even more preferably 10/90 to 30/70, still more preferably 15/85 to 25/75.

The content of the structural unit (b1) to the sum total of the polymer block (b) and the polymer block (c) in the block copolymer (P) [(b1)/((b)+(c))] is preferably 30 to 99% by mass. When the ratio falls within the range, an elastic member excellent in elasticity restoration can be obtained. From this viewpoint, the ratio by mass [(b1)/((b)+(c))] is preferably 30 to 90% by mass, more preferably 40 to 80% by mass, even more preferably 45 to 70% by mass, still more preferably 50 to 70% by mass.

Here, the structural unit (b1) in the mass ratio [(b1)/((b)+(c))] is the total of the structural unit (b1) contained in the polymer block (b) and the structural unit (b1) contained in the polymer block (c).

The total content of the polymer block (a), the polymer block (b) and the polymer block (c) in the block copolymer (P) is preferably 80% by mass or more, more preferably 90% by mass or more, even more preferably 95% by mass or more, still more preferably 99% by mass or more, further more preferably 100% by mass.

The peak top molecular weight (Mp) of the hydrogenated block copolymer (1) is, from the viewpoint of molding processability, preferably 4,000 to 500,000, more preferably 9,000 to 450,000, even more preferably 30,000 to 400,000, further more preferably 50,000 to 380,000. The peak top molecular weight (Mp) in this description means a value measured according to the method descried in the section of Examples to be given below.

The molecular weight distribution (Mw/Mn) of the hydrogenated block copolymer (I) is preferably 1 to 4, more preferably 1 to 3, even more preferably 1 to 2. When the molecular weight distribution falls within the range, the viscosity of the hydrogenated block copolymer (1) fluctuates little and the copolymer is easy to handle.

The block copolymer (P) may contain, in addition to the polymer block (a), the polymer block (b) and the polymer block (c), a polymer block (d) formed of any other monomer within a range not detracting from the advantageous effects of the present invention.

Examples of the other monomer include unsaturated hydrocarbon compounds such as propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene; functional group-containing unsaturated compounds such as acrylic acid, methacrylic acid, methyl acrylate, methyl methacrylate, acrylonitrile, methacrylonitrile, maleic acid, fumaric acid, crotonic acid, itaconic acid, 2-acryloylethanesulfonic acid, 2-methacryloylethanesulfonic acid, 2-acrylamide-2-methylpropanesulfonic acid, 2-methacrylamide-2-methylpropanesulfonic acid, vinylsulfonic acid, vinyl acetate and methyl vinyl ether; and the like. These other monomers may be used alone or in combination of any two or more thereof.

When the block copolymer (P) contains the polymer block (d), the content thereof is preferably 50% by mass or less, more preferably 40% by mass or less, still more preferably 30% by mass or less.

For example, the hydrogenated block copolymer (I) of one embodiment is a hydrogenate of the block copolymer (P) that contains the above-mentioned polymer block (a), the polymer block (b) and the polymer block (c), and the polymer block (c) is a polymer block having a content of (b1) of less than 1% by mass and having a content of the structural unit (b2) derived from a conjugated diene except farnesene of 1 to 100% by mass, in which the ratio by mass of the polymer block (a) to the total of the polymer block (b) and the polymer block (c) $[(a)/((b)+(c))]$ is 1/99 to 70/30, and the hydrogenated block copolymer (I) is a hydrogenate of the block copolymer (P) containing at least two above polymer blocks (a), at least one above polymer block (b) and at least one above polymer block (c), in which at least one above polymer block (b) exists at the terminal of the copolymer.

Here, a polymer block formed of poly(β-farnesene) alone is represented by F, a polymer block formed of polystyrene alone is by St, a polymer block formed of polyisoprene alone is by Ip, a polymer block formed of polybutadiene alone is by Bd, a polymer block formed of β-farnesene and isoprene alone is by F/Ip, and a polymer block formed of β-farnesene and butadiene alone is by F/Bd.

In this case, a hydrogenate of a penta-block copolymer with F, St, Bd, St, F bonding in that order (F-St-Bd-St-F), and hydrogenate of a penta-block copolymer with F, St, Ip, St, F bonding in that order (F-St-Ip-St-F) are preferred.

[Production Method for Hydrogenated Block Copolymer (I)]

The hydrogenated block copolymer (I) may be favorably produced, for example, according to a process of a polymerization step of preparing the block copolymer (P) through anionic polymerization and a step of hydrogenating the carbon-carbon double bond derived from farnesene and the carbon-carbon double bond derived from a conjugated diene except farnesene existing in the block copolymer (P).

[Polymerization Step]

The block copolymer (P) can be produced according to a solution polymerization method or the method described in JP-T 2012-502135, JP-T 2012-502136, etc. Above all, a solution polymerization method is preferred, and for example, a known method of an ionic polymerization method of anionic polymerization, cationic polymerization or the like, or a radical polymerization method or the like is employable. Above all, an anionic polymerization method is preferred. In an anionic polymerization method in the presence of a solvent, an anionic polymerization initiator and optionally a Lewis base, an aromatic vinyl compound, a farnesene, and/or a conjugated diene except farnesene are successively added to produce the block copolymer (P).

Examples of the anionic polymerization initiator include alkali metals such as lithium, sodium, potassium, etc.; alkaline earth metals such as beryllium, magnesium, calcium, strontium, barium, etc.; lanthanoid rare earth metals such as lanthanum, neodymium, etc.; compounds containing any of the above-mentioned alkali metals, alkaline earth metals and lanthanoid rare earth metals, etc. Above all, compounds containing an alkali metal or an alkaline earth metal are preferred, and organic alkali metal compounds are preferred.

Examples of the organic alkali metal compound include organic lithium compounds such as methyl lithium, ethyl lithium, n-butyl lithium, sec-butyl lithium, t-butyl lithium, hexyl lithium, phenyl lithium, stilbene lithium, dilithiomethane, dilithionaphthalene, 1,4-dilithiobutane, 1,4-dilithio-2-ethylcyclohexane, 1,3,5-trilithiobenzene, etc.; and sodium naphthalene, potassium naphthalene, etc. Above all, organic lithium compounds are preferred, n-butyl lithium and sec-butyl lithium are more preferred, and sec-butyl lithium is even more preferred. The organic alkali metal compound may be used as an organic alkali metal amide after reacting it with a secondary amine such as diisopropylamine, dibutylamine, dihexylamine, dibenzylamine or the like.

The amount of the organic alkali metal compound to be used in polymerization differs depending on the molecular weight of the block copolymer (P) to be produced, but is generally within a range of 0.01 to 3% by mass relative to the total amount of the aromatic vinyl compound, farnesene and the other conjugated diene than farnesene.

The solvent is not specifically limited so far as it does not have any negative influence on anionic polymerization, and examples thereof include saturated aliphatic hydrocarbons such as n-pentane, isopentane, n-hexane, n-heptane, isooctane, etc.; saturated alicyclic hydrocarbons such as cyclopentane, cyclohexane, methylcyclopentane, etc.; aromatic hydrocarbons such as benzene, toluene, xylene, etc. One alone or two or more of these may be used either singly or as combined. The amount of the solvent to be used is not specifically limited.

A Lewis base plays a role of controlling the microstructure in the structural unit derived from farnesene and in the structural unit derived from a conjugated diene except farnesene. Examples of the Lewis base of the type include ether compounds such as dibutyl ether, diethyl ether, tetrahydrofuran, dioxane, ethylene glycol diethyl ether, etc.; pyridine; tertiary amines such as N,N,N',N'-tetramethylethylenediamine, trimethylamine, etc.; alkali metal alkoxides such as potassium t-butoxide, etc.; phosphine compounds, etc. In the case where a Lewis base is used, the amount thereof is preferably within a range of 0.01 to 1,000 molar equivalents relative to 1 mol of the anionic polymerization initiator.

The polymerization reaction temperature is within a range of generally −80 to 150° C., preferably 0 to 100° C., more preferably 10 to 90° C. The polymerization reaction mode may be a batch mode or a continuous mode. The monomers may be continuously or intermittently put into a polymerization reaction solution in such a manner that the amount of the aromatic vinyl compound, that of the farnesene and/or that of the conjugated diene except farnesene in a polymerization reaction system could be each within a specific range, or the monomers may be sequentially polymerized in such a manner that the monomers could be in a specific ratio in the polymerization reaction solution, thereby producing the block copolymer (P).

The polymerization reaction may be stopped by adding an alcohol such as methanol, isopropanol or the like as a polymerization terminator. The resultant polymerization reaction solution is poured into a poor solvent such as methanol or the like to thereby precipitate the block copolymer (P) therein, or the polymerization reaction solution is washed with water, separated and dried to isolate the block copolymer (P).

In the polymerization step, an unmodified block copolymer (P) may be obtained as described above, but a modified block copolymer (P) may also be obtained by introducing a functional group into the block copolymer (P) before the hydrogenation step to be described below, or a modified block copolymer may be obtained by introducing a functional group at the time of the hydrogenated block copolymer (I). Examples of the introducible functional group include an amino group, an alkoxysilyl group, a hydroxyl group, an epoxy group, a carboxyl group, a carbonyl group, a mercapto group, an isocyanate group, an acid anhydride, etc.

Example of the modification method for the block copolymer (P) include a method of adding a modifier capable of reacting with a polymerization active terminal, such as tetrachlorotin, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane, 2,4-tolylene diisocyanate, 4,4'-bis(diethylamino)benzophenone, N-vinylpyrrolidone, etc., or any other modifier as described in JP 2011-132298 A, prior to addition of a polymerization terminator. Alternatively, after isolation of the copolymer, it may be grafted with a maleic anhydride, etc.

The position to which the functional group is introduced may be the polymerization terminal of the block copolymer (P), or may also be the side chain thereof. One or more of the above-mentioned functional groups may be used optionally as combined. Preferably, the modifier is used in an amount falling within a range of 0.01 to 10 molar equivalents relative to the anionic polymerization initiator.

<Hydrogenation Step>

In a step of hydrogenating the block copolymer (P) or the modified block copolymer (P) obtained in the above-mentioned process, a hydrogenated block copolymer (I) can be obtained. Any known method is employable as the hydrogenation process. For example, the block copolymer (P) is dissolved in a solvent not having any influence on hydrogenation to prepare a solution thereof, and hydrogenated in the presence of a Ziegler catalyst, or a nickel, platinum, palladium, ruthenium or rhodium metal catalyst supported by carbon, silica, diatomaceous earth or the like, or an organic metal complex having a cobalt, nickel, palladium, rhodium or ruthenium metal or the like serving as a hydrogenation catalyst. In the hydrogenation step, the hydrogenation may be carried out by adding the hydrogenation catalyst to a polymerization reaction solution containing the block copolymer (P) obtained according to the above-mentioned production method for the block copolymer (P).

In the present invention, palladium-carbon where palladium is supported by carbon is preferably used.

In the hydrogenation, the hydrogen pressure is preferably 0.1 to 20 MPa, the reaction temperature is preferably 100 to 200° C., and the reaction time is preferably 1 to 20 hours.

The hydrogenation rate of the total of the carbon-carbon double bond derived from farnesene and the carbon-carbon double bond derived from a conjugated diene except farnesene existing in the polymer block (b) and the polymer block (c) is, from the viewpoint of obtaining the an elastic member excellent in elasticity restoration, 50 to 100 mol %. The hydrogenation rate is preferably 70 to 100 mol %, more preferably 80 to 100 mol %, even more preferably 90 to 100 mol %.

The hydrogenation rate can be calculated by analyzing $^1$H-NMR of the block copolymer (P) and the hydrogenated block copolymer (I) after hydrogenation.

[Polystyrene Resin (II)]

The thermoplastic elastomer composition of this embodiment may contain a polystyrene resin (II) in addition to the hydrogenated block copolymer (I. Containing a polystyrene resin (II), the strength of the elastic member may increase.

The weight-average molecular weight of the polystyrene resin (II) is preferably 100,000 to 400,000, more preferably 120,000 to 350,000, even more preferably 150,000 to 300,000. When the weight-average molecular weight of the polystyrene resin (II) is 100,000 or more, heat resistance may increase, and when 400,000 or less, molding processability may improve.

In the case where the thermoplastic elastomer composition of this embodiment contains a polystyrene resin (II), the content of the polystyrene resin (II) is preferably within a range of 1 to 70 parts by mass relative to 100 parts by mass of the hydrogenated block copolymer (I). When the content of the polystyrene resin (II) falls within the range, the strength of the thermoplastic elastomer composition may increase more. From this viewpoint, the content of the polystyrene resin (II) is more preferably 1 to 60 parts by mass relative to 100 parts by mass of the hydrogenated block copolymer (I), even more preferably 5 to 50 parts by mass, still more preferably 10 to 50 parts by mass, and further more preferably 15 to 50 parts by mass.

[Softening Agent (III)]

The thermoplastic elastomer composition of the present invention may further contain a softening agent (II). As the softening agent (III), any one generally usable in rubber and plastics can be used. For example, there are mentioned a paraffinic, naphthenic or aromatic process oil; a phthalic acid derivative such as dioctyl phthalate, dibutyl phthalate, etc.; a white oil; a mineral oil; a liquid co-oligomer of ethylene and α-olefin; a liquid paraffin; a polybutene; a low-molecular-weight polyisobutylene, a liquid polydiene and a hydrogenate thereof such as a liquid polybutadiene, a liquid polyisoprene, a liquid polyisoprene/butadiene copolymer, a liquid styrene/butadiene copolymer, a liquid styrene/isoprene copolymer, etc. Above all, from the viewpoint of compatibility with the hydrogenated block copolymer (I), a paraffinic process oil, a liquid co-oligomer of ethylene and α-olefin, a liquid paraffin, a low-molecular-weight polyisobutylene and a hydrogenate thereof are preferred, and a hydrogenated paraffin process oil is more preferred.

One alone or two or more kinds of softening agents (III) may be used either singly or as combined.

In the case where the thermoplastic elastomer composition of this embodiment contains a softening agent (III), the content of the softening agent (III) is preferably within a range of 1 to 150 parts by mass relative to 100 parts by mass of the hydrogenated block copolymer (I). When the content of the softening agent (III) falls within the range, the flexibility and the molding processability of the thermoplastic elastomer composition may improve more. From this viewpoint, the content of the softening agent (III) is more preferably 5 to 150 parts by mass relative to 100 parts by mass of the hydrogenated block copolymer (I), more preferably 10 to 160 parts by mass, even more preferably 15 to 120 parts by mass.

[Other Hydrogenated Block Copolymer]

The thermoplastic elastomer composition of this embodiment may contain any other hydrogenated block copolymer than the hydrogenated block copolymer (I).

Examples of the other hydrogenated block copolymer than the hydrogenated block copolymer (I) include a hydrogenated block copolymer prepared by hydrogenating a block copolymer containing the polymer block (a) and the polymer block (c). The preferred embodiments of the polymer block (a), the polymer block (c) and the hydrogenation rate of the other hydrogenated block copolymer are the same as the preferred embodiments of the constituent polymer blocks and the hydrogenation rate of the hydrogenated block copolymer (I).

In the case where the thermoplastic elastomer composition contains any other hydrogenated block copolymer, the content thereof is preferably 100 parts by mass or less relative to 100 parts by mass of the hydrogenated block copolymer (I).

[Other Optional Component]

The thermoplastic elastomer composition of this embodiment may contain, if desired, any other thermoplastic polymer, an inorganic filler, a tackifier resin, an antioxidant, a lubricant, a light stabilizer, a processing aid, a colorant such as pigment or dye, a flame retardant, an antistatic agent, a delustrant, a silicone oil, an antiblocking agent, a UV absorbent, a release agent, a foaming agent, a microbicide, a fungicide and a perfume within a range not detracting from the advantageous effects of the present invention.

In the case where the composition contains any other thermoplastic polymer, the content thereof is preferably 100 parts by mass or less relative to 100 parts by mass of the hydrogenated block copolymer (I), more preferably 50 parts by mass or less, even more preferably 20 parts by mass or less, still more preferably 10 parts by mass or less.

The inorganic filler may be contained in the thermoplastic elastomer composition of the present invention for the purpose of improving the physical properties such as heat resistance, weather resistance and the like of the composition, for regulating the hardness thereof, and serving as an extender, for the purpose of improving the economic performance of the composition. Examples of the inorganic filler include calcium carbonate, talc, magnesium hydroxide, aluminum hydroxide, mica, clay, natural silicic acid, synthetic silicic acid, titanium oxide, carbon black, barium sulfate, glass balloons, glass fibers, etc. One alone or two or more kinds of the inorganic fillers may be used either singly or as combined.

In the case where the inorganic filler is contained, the content thereof is preferably within a range not detracting from the flexibility of the thermoplastic elastomer composition, and is preferably 100 parts by mass or less relative to 100 parts by mass of the hydrogenated block copolymer (I), more preferably 70 parts by mass or less, even more preferably 30 parts by mass or less, still more preferably 10 parts by mass or less.

A method for producing the thermoplastic elastomer composition of the present invention is not specifically limited, and the composition may be produced in any method capable of uniformly mixing the hydrogenated block copolymer (I), and optionally the polystyrene resin (II), the softening agent (II) and other components. A melt kneading method is preferably used. Melt kneading the components may be carried out using a melt-kneading apparatus such as, for example, a single-screw extruder, a twin-screw extruder, a kneader, a batch mixer, a roller, a Banbury mixer, etc. Preferably, the components are melt-kneaded at 170 to 270° C. to produce the thermoplastic elastomer composition of the present invention.

[Physical Properties of Thermoplastic Elastomer Composition]

The thermoplastic elastomer composition of this embodiment is such that the hysteresis loss rate in one cycle (the hysteresis loss rate in the first cycle) of deformation and restoration of a specimen is 20% or less. The specimen is prepared by blanking a 0.5 mm-thick sheet formed by compression molding of the thermoplastic elastomer composition at 240° C. and under a load of 10 MPa for 3 minutes into a strip specimen having a width of 25 mm and a length of 150 mm. In the cycle, the specimen is 100% expanded at a temperature of 23° C. and then shrunk. Accordingly, the elastic member produced by molding the thermoplastic elastomer composition having the physical property is excellent in elasticity restoration. The hysteresis loss rate is preferably 19% or less, more preferably 17% or less, even more preferably 16% or less.

From the same viewpoint, the hysteresis loss rate in the second cycle of deformation and restoration in two cycles of the operation of 100% expanding the specimen at a temperature of 23° C. and at a speed of 100 mm/min and then shrinking it at a speed of 100 mm/min is preferably 15% or less, more preferably 14% or less, even more preferably 13% or less, still more preferably 12% or less.

In some cases, it is desirable that in expansion and shrinking in plural times of the elastic member, the hysteresis loss rate does not change greatly. For example, in the case where the elastic member is used in gathering a diaper, it is desirable that there is not any significant change in the feel of the diaper before and after wearing it. From this viewpoint, the ratio of the hysteresis loss rate ($L_2$) in the second cycle to the hysteresis loss rate ($L_1$) in the first cycle ($L_2/L_1$) is preferably 0.40 or more, more preferably 0.50 or more, even more preferably 0.60 or more, still more preferably 0.70 or more.

Further, in the measurement of the hysteresis loss rate in the first cycle of the specimen, the tensile stress thereof at 100% elongation at a temperature of 23° C. (100% modulus) is, from the viewpoint of the strength of the elastic member, preferably 0.02 MPa or more, more preferably 0.05 MPa or more, even more preferably 0.10 MPa or more.

<Form of Elastic Member>

The form of the elastic material of this embodiment is not specifically limited, and may be any form suitable to applications and types of usage thereof. For example, the elastic material is preferably in a form of films, nonwoven fabrics, strands or bands.

In the case where the elastic material is a film, the thickness and the width thereof are not specifically limited and may be selected adequately. In general, the thickness of the film is preferably 15 µm to 200 µm or so.

Also in the case where the elastic material is a nonwoven fabric, the fineness of the fibers constituting the nonwoven fabric and the basis weight of thereof may be adequately defined in accordance with the applications thereof. In general, it is desirable that the fibers constituting a nonwoven fabric of the elastic material are long fibers having a uniform fineness as the nonwoven fabric of the type is excellent in mechanical properties. The basis weight of the nonwoven fabric is preferably 5 to 300 g/m² or so, from the viewpoint of handleability. The mean fiber diameter of the nonwoven fabric is preferably 1 to 30 μm, more preferably 5 to 20 μm.

In the case where the elastic material is a strand, the cross section thereof may be circular, oval, square or may be in a form of a linear form, a string-like form or the like having any other cross-sectional form than these. Also in the case where the elastic material is a band form, the thickness and the width thereof are not specifically limited, and may be adequately selected. In general, the thickness of the band form is preferably 200 μm to 2 mm or so. In the case where the elastic material is a nonwoven fabric, the fineness of the fibers constituting the nonwoven fabric and the basis weight of the nonwoven fabric may be adequately defined in accordance with the use thereof. In general, in the elastic material in the form of a nonwoven fabric, the fibers constituting the nonwoven fabric are preferably long fibers having a uniform fineness as the nonwoven fabric of the type is excellent in mechanical properties. The basis weight of the nonwoven fabric is preferably 6 to 200 g/m² or so from the viewpoint of handleability.

A method for molding the thermoplastic elastomer composition into an elastic material may be adequately selected in accordance with the form of the elastic material. For example, in the case where the elastic material is in the form of a film, a strand or a nonwoven fabric, a molding and working method generally used in molding a thermoplastic polymer material into a film, a strand or a nonwoven fabric is preferably employed.

For example, in the case of molding into a film or a strand, the material may be formed into a film form or a strand form using a single-screw or twin-screw extrusion molding machine.

As a method of molding into a nonwoven fabric, for example, the thermoplastic elastomer composition is melt-spun using an ordinary melt-blow nonwoven fabric producing apparatus, the resulting fiber group is formed into a fiber web on the collector surface to thereby produce a melt-blown nonwoven fabric. A nonwoven fabric-type elastic material may also be produced according to a spun-bonding method.

The elastic material of this embodiment can be used as an elastic member directly as it is. The shape stability of the elastic material can be improved by being laminated and bonded to at least one expandable fabric selected from an extending fabric and a gathered fabric capable of extending at least in one direction. The elastic members having a complicated shape necessary for sanitary materials such as paper diapers, training pants, women's sanitary products, etc., and for medical materials such as pack substrates, elastic tapes, surgical bandages, operation gowns and the like can be thereby obtained.

EXAMPLES

Hereinafter, the present invention is described with reference to Examples, but the present invention is not limited to these Examples. β-farnesene (purity 97.6% by mass, manufactured by Amyris Biotechnology, Inc.) was purified through a 3 A molecular sieve and distilled in a nitrogen atmosphere to remove hydrocarbon impurities such as zingiberene, bisabolene, farnesene epoxide, farnesol isomers, E,E-farnesol, squalene, ergosterol, a few kinds of dimers of farnesene, etc., and then used in the following polymerization.

(1) Measurement of Weight-Average Molecular Weight, Molecular Weight Distribution and Peak Top Molecular Weight (Mp)

The weight-average molecular weight (Mw) and the molecular weight distribution (Mw/Mn) of the hydrogenated block copolymers obtained in Examples 1 to 3, Comparative Examples 1 to 4 and Reference Examples 1 and 2 were determined in terms of a standard polystyrene-equivalent molecular weight thereof through GPC (gel permeation chromatography), and from the position of the peak top of the molecular weight distribution, the peak top molecular weight (Mp) was obtained. Regarding the peak top molecular weight of each polymer block, the polymerization solution was sampled before and after addition of the monomer to constitute each block, and the value was calculated from the difference in the peak top molecular weight obtained through GPC of the resultant sample. The measurement apparatus and condition are as follows.

Apparatus: GPC apparatus by Tosoh Corporation "GPC8020"

Separation column: "TSKgel G4000HXL" by Tosoh Corporation

Detector: "RI-8020" by Tosoh Corporation

Solvent: Tetrahydrofuran

Solvent flow rate: 1.0 ml/min

Sample concentration: 5 mg/10 ml

Column temperature: 40° C.

(2) Method for Measurement of Hydrogenation Rate

In Examples 1 to 3, Comparative Examples 1 to 4 and Reference Examples 1 and 2, the block copolymer (P) and the hydrogenated block copolymer (HP) after hydrogenation were individually dissolved in a solvent of heavy chloroform, and using "Lambda-500" by JEOL Ltd., the resultant solution was analyzed for $^1$H-NMR at 50° C. The hydrogenation rate of the polymer blocks (B) and (C) in the hydrogenated block copolymer (HP) was calculated from the peak of the proton of the carbon-carbon double bond appearing at 4.5 to 6.0 ppm in the resultant spectrum, according to the following equation.

$$\text{Hydrogenation Rate} = \{1 - (\text{molar number of carbon-carbon double bond contained in 1 mol of hydrogenated block copolymer (HP)})/(\text{molar number of carbon-carbon double bond contained in 1 mol of block copolymer (P)})\} \times 100 \text{ (mol \%)}$$

(3) Order-Disorder Transition Temperature (ODT)

The hydrogenated block copolymer obtained in Examples 1 to 3, Comparative Examples 1 to 4 and Reference Examples 1 and 2 was compression-molded at 200° C. and 1.0 MPa for 3 minutes to form a sheet-like molded article (length 150 mm, width 150 mm, thickness 1 mm). A columnar specimen having a diameter of 25 mm and a height of 1 mm was blanked out from the sheet, and using "RDA3 Viscoelastometer" by Rheometric Scientific Co., Ltd., the shear storage elastic modulus G' thereof was measured under the condition of a measurement temperature of 100 to 850° C., a frequency of 1 Hz and a strain of 5% according to the method of JIS K7244-10. On the resultant chart, the temperature at the intersection between the baseline and the tangent line at which the shear storage elastic modulus G' began to lower was referred to as an order-disorder transition temperature (ODT).

(4) Co-Extrusion Moldability

The hydrogenated block copolymer and the hydrogenated block copolymer composition obtained in Examples 4 to 10 and Comparative Examples 5 to 12 were co-extruded according to a T-die extrusion method to evaluate the co-extrusion moldability thereof. Those which had cracks in the adhesive layer and could not form a uniform laminate were grouped in [1]; those which could form a laminate but had thickness unevenness, that is, those which could not form a uniform laminate were grouped in [2]; and those which formed a laminate having a uniform film thickness were grouped in [3].

(5-1) Peel Strength (i)

A laminate obtained in Examples 4 to 10 and Comparative Examples 5 to 12 was cut into a specimen having a width of 25 mm, and stuck to a smooth acrylic resin plate ("Comoglas P" by Kuraray Co., Ltd., thickness 3 mm) in such a manner that the adhesive layer could adhere to the acrylic resin plate to prepare a specimen. Using a 2-kg rubber roller, the specimen was rolled from the substrate layer side thereof at a speed of 20 mm/min, and then left in an atmosphere at a temperature of 23±1% and a humidity of 50±5% for 24 hours. Subsequently, according to JIS Z0237, the 180° peel strength was measured, at a peeling rate of 300 mm/min.

(5-2) Peel Strength (ii)

Film Formation Using Hydrogenated Block Copolymer Composition

Using a compression-press molding machine "NF-37" by Shinto Metal Industries Corporation and using a Teflon (registered trademark)-coated metal frame as a spacer, the hydrogen block copolymer composition obtained in Examples 11 to 16, 24 and 25 and Comparative Examples 13 to 19, 28 and 29 was compression-molded by pressing at 230° C. and under a load of 100 kgf/cm² for 5 minutes, and then compression-molded by pressing at 18° C. and under a load of 15 kgf/cm² for 1 minute to produce a film of the hydrogenated block copolymer composition having a thickness of 1 mm.

Formation of Sample (Laminate) for Measurement

<Laminate of Hydrogenated Block Copolymer Composition Film and Polycarbonate (PC) Plate>

Both surfaces of a polycarbonate (PC) plate having a length 76 mm×width 25 mm×thickness 1 mm were washed with an aqueous surfactant solution and distilled water in that order, and then dried. The polycarbonate plate, the above film of hydrogenated block copolymer composition and a polyethylene terephthalate (PET) sheet having a thickness of 50 μm were layered in that order and set in the center part of a metallic spacer having an outer dimension of 200 mm×200 mm, an inner dimension of 150 mm×160 mm and a thickness of 2 mm.

The sheet and the metallic spacer thus layered were sandwiched between polytetrafluoroethylene sheets and further sandwiched from the outside between metal plates, and using a compression-molding machine, this was compression-molded under a temperature condition of 160° C. and under a load of 20 kgf/cm² (2 N/mm²) for 3 minutes to produce a laminate of PET/hydrogenated block copolymer composition/polycarbonate plate.

<Formation of Other Laminates>

Laminates were produced according to the same method as above except that a polymethyl methacrylate resin (PMMA) plate, an acrylonitrile-butadiene-styrene resin (ABS) plate, a nylon 6 (PA6) plate, a polypropylene (PP) plate or an aluminum plate was used in place of the polycarbonate (PC) plate.

The details of each plate used in molding the laminates are as follows.

Polycarbonate (PC) plate: Iupiron S-3000R, by Mitsubishi Engineering-Plastics Corporation Polymethyl methacrylate resin (PMMA) plate: Plexiglas 6N by Evonik Industries AG Acrylonitrile-butadiene-styrene resin plate: Tobyolac 700 by Toray Industries, Inc.

Nylon 6 plate: UBE Nylon 6 1013B by Ube Industries, Ltd.

Polypropylene plate: Novatec PP MA3 by Japan Polypropylene Corporation

Method for Measurement of Peel Strength

Using "Instron 5566" by Instron Co., Ltd., a peel adhesion strength test was carried out at a peel angle of 180° and a pulling rate of 100 mm/min according to JIS K6854-2 to measure peel strength.

(6) Draw Resonance and Melt Extendibility

The draw resonance and the melt rollability of the hydrogenated block copolymer and the hydrogenated block copolymer composition obtained in Examples 4 to 29 and Comparative Examples 5 to 32 were measured as follows. Using Capillograph 1D (manufactured by Toyo Seiki Seisaku-sho, Ltd.), a molten resin was extruded out through a die having a length of 10 mm and a diameter of 1.0 mm, at the temperature shown below and at an extrusion rate of 10 mm/min, and the melt was taken up at a take-up speed of 10 m/min to measure the tension for 30 seconds. The difference calculated by subtracting the minimum value from the maximum value was referred to as a draw resonance. The take-up speed was increased from 2 m/min by 2 m/min at intervals of 2 minutes, and the take-up speed at which the molten resin cut was referred to as melt extendibility to be an index of moldability.

<Temperature Condition for Draw Resonance>

Examples 4 to 21, 24, 25, Comparative Examples 5 to 25: 220° C.

Examples 22, 23, 26 to 29, Comparative Examples 26, 27, 30 to 32: 120° C.

(7) Extrusion Film Moldability

The hydrogenated block copolymer and the hydrogenated block copolymer composition obtained in Examples 11 to 16, 24 and 25 and Comparative Examples 13 to 19, 28 and 29 each was extruded according to a T-die extrusion method to evaluate the extrusion film moldability thereof. Those which had cracks and could not form a film were grouped in [1]; those which could form a film but had thickness unevenness, that is, those which could not form a uniform film were grouped in [2]; and those which formed a film having a uniform thickness were grouped in [3].

(8) Melt Blow Moldability

In evaluation of the melt blow moldability in melt blow-molding the hydrogenated block copolymer and the hydrogenated block copolymer composition obtained in Examples 17 to 21 and Comparative Examples 20 to 25, those in which the fiber diameter of the fibers constituting the resultant nonwoven fabric was 100 μm or more were grouped in [1], and those in which the diameter was less than 100 μm were grouped in [2].

(9) Hot Melt Coatability

The hydrogenated block copolymer and the hydrogenated block copolymer composition obtained in Examples 22, 23, 26 to 29 and Comparative Examples 26, 27, 30 to 32 were individually applied to a substrate, and the thickness of the resultant adhesive layer was measured at 3 points for evaluating the hot melt coatability thereof. Those in which the mean value was 25±3 µm were grouped in [1], and those in which the mean value was less than 25±3 µm were grouped in [2].
(10) Melt Viscosity
The melt viscosity at 160° C. or 180° C. of the hydrogenated block copolymer and the hydrogenated block copolymer composition obtained in Examples 22, 23, 26 to 29 and Comparative Examples 26, 27, 30 to 32 was measured using a B-type viscometer manufactured by Brookfield Engineering Labs. Inc.
(11) Injection Moldability
Pellets of the hydrogenated block copolymer composition obtained in Examples 30 to 34 and Comparative Examples 33 to 35 were injection-molded using an injection molding machine ("EC75SX" by Toshiba Machine Co., Ltd.) to produce a sheet-like specimen having a length of 110 mm, a width of 110 mm and a thickness of 2 mm. The appearance (flow mark) of the resultant sheet was evaluated based on the following criteria.
<Criteria>
No flow mark was seen: 3
Flow marks were partly seen: 2
Flow marks were seen entirely: 1
(12) Shape Retention
The length in the machine (lengthwise) direction MD and that in the transverse (cross) direction TD of the sheet obtained in evaluation of injection moldability were measured, and the size retention relative to the mold (11×11 cm) was evaluated.
(13) Tear Strength
The tear strength in the machine (lengthwise) direction MD and that in the transverse (cross) direction TD of the sheet obtained in evaluation of injection moldability were measured. Briefly, according to JIS K 6252, the notchless angle form tear strength of each sheet was measured.
(14) Peel Strength (to Polyurethane)
Using "Instron 5566" by Instron Co., Ltd. and according to JIS K6854-2, a peel adhesion strength test was carried out at a peel angle of 180° and a pulling rate of 100 mm/min to measure adhesive strength (peel strength).
Peel test samples were prepared according to the following method.
First, an injection-molded sheet of polyurethane was formed using an injection-molding machine ("EC75SX" by Toshiba Machine Co., Ltd.), and the polyurethane sheet and the injection-molded sheet obtained in Examples and Comparative Examples were cut into a size of 25 mm width. Next, using a cloth impregnated with a primer, the primer was applied on the surface of each sheet, and dried at 50° C. for 10 minutes. After the primer was dried, an adhesive was applied to each sheet of Examples and Comparative Examples using a brush, and dried at 50° C. for 10 minutes. After the adhesive was dried, the sheet of Examples and Comparative Examples and the polyurethane sheet were immediately bonded by compression using a pressing machine (20 kgf/cm$^2$×15 seconds: 25° C.) to prepare a sample for peel test. After thus bonded, the sample was aged for 24±2 hours and then the peel strength thereof was evaluated.
Regarding the evaluation criteria, those having a peel strength of 50 N/25 mm or more were grouped in [2], and those having less than 50 N/25 mm were grouped in [1].
The polyurethane, the primer and the adhesive used in producing the above-mentioned peel test samples are shown below.

Polyurethane: Elastollan 1190A (by BASF)
Primer: PE-120 (by No-tape Industrial Co., Ltd.)/Desmodur RFE (by No-tape Industrial Co., Ltd.)=95/5 (ratio by mass)
Polyurethane: SK-1 (by No-tape Industrial Co., Ltd.)
Adhesive: 5999 (by No-tape Industrial Co., Ltd.)/Desmodur RFE (by No-tape Industrial Co., Ltd.)=97/3 (ratio by mass)
(15) Measurement of Hardness
According to JIS K 6253, 20 sheets each having a thickness of about 0.3 mm of the hydrogenated block copolymer composition obtained before lamination in the process of calender-molding in Examples 35 to 38 and Comparative Examples 36 to 39 were laid one on top of another to be in a thickness of 6 mm or more, and the hardness thereof was measured. As a hardness meter, a type-A durometer was used, and the momentary value was recorded as the measured value. When the type-A hardness is preferably 45 or less, more preferably 35 or less, even more preferably 30 or less, the laminate or the foamed laminate is excellent in flexibility.
(16) Measurement of Adhesive Force
The laminate or the foamed laminate obtained in Examples 35 to 38 and Comparative Examples 36 to 39 was left in an atmosphere at 23±1° C. and a humidity (50±5) % for 30 minutes. Subsequently, a strip specimen having a length of 80 mm and a width of 26 mm was blanked out from the laminate or the foamed laminate. The specimen was tested according to the "180° peel test" described in JIS K 6854 at a peeling rate of 300 mm/min to measure the adhesive force thereof.
The adhesive force is preferably 10 N/25 mm or more, more preferably 15 N/25 mm or more. In the case where the layer (1) of the thermoplastic polymer composition was broken during the test, it means that the adhesive force is insufficient.
(17) Evaluation of Softening Agent Bleed-Out Preventive Performance
The laminate or the foamed laminate obtained in Examples 35 to 38 and Comparative Examples 36 to 39 was left in an atmosphere at 23±1° C. and at a humidity (50±5)%, then visually checked for the presence or absence of bleeding out of the softening agent, and evaluated according to the following evaluation criteria. Regarding the evaluation, B is preferred, and A is more preferred.
A: After 3 months, the softening agent did not bleed out on the surface of the fabric.
B: In 1 to 3 months, the softening agent bled out on the surface of the fabric.
C: In 1 week to shorter than 1 month, the softening agent bled out on the surface of the fabric.
D: Immediately after production of the laminate or the foamed laminate, the softening agent bled out on the surface of the fabric.
(18) Calender-Molding Processability
In Examples 35 to 38 and Comparative Examples 36 to 39, the unlaminated sheet of the hydrogenated block copolymer composition obtained in calender molding was evaluated according to the following evaluation criteria.
A: The thickness of the sheet was measured at 10 points randomly selected, and all the measured data were 0.3±0.02 mm, and the thickness of the sheet is uniform.
B: The thickness of the sheet was measured at 10 points randomly selected, and at least one of the measured data was 0.3±0.02 mm or more, and the thickness of the sheet is not uniform.
(19) Foam Moldability
The foamed laminate obtained in Example 38 and Comparative Example 39 was cut into halves with a cutter in the direction of the height thereof, and the uniformity of the foamed cell size was visually evaluated.
A: The cell size was uniform, and fine closed cells were dispersed.
B: Since the calendering was insufficient, a uniform sheet could not be obtained, and the foamed cell size was extremely non-uniform.
(20) Flexibility By compression molding at 190° C. and 10 MPa for 8 minutes, a sheet (length 80 mm, width 60 mm, thickness 1.6 mm) was obtained. Based on the sense of touch to the sheet when bent, the flexibility of the sheet was evaluated according to the following criteria.
<Criteria>
A: The sheet was flexible and was bent easily.
B: The sheet was bent.
C: The sheet was difficult to bend.

Production Example 1

<Polar Group-Containing Polyolefin Polymer>

42 g of polypropylene "Prime Polypro F327" (MFR [230° C., load 2.16 kg (21 N)]: 7 g/10 min, manufactured by Primer Polymer Co., Ltd.), 160 mg of maleic anhydride and 42 mg of 2,5-dimethyl-2,5-di(tert-butylperoxy)hexane were melt-kneaded in a batch mixer at 180° C. and at a screw rotation number of 40 rpm to prepare a maleic anhydride group-having polypropylene.

MFR [230° C., 21 N] of the resultant polar group-having polyolefin polymer was 6 g/10 min, the proportion of the maleic anhydride group-containing structural unit was 0.3% by mass, and the melting point was 138° C. The proportion of the maleic anhydride group-containing structural unit was a value obtained by titrating the resultant polar group-containing polyolefin polymer with a methanol solution of potassium hydroxide. The melting point was a value read from the endothermic peak of the differential scanning colorimetry curve drawn by heating at 10° C./min.

Production Example 2

<Polyvinyl Acetal Resin> n-Butylaldehyde and an acid catalyst (hydrochloric acid) were added to an aqueous solution prepared by dissolving a polyvinyl alcohol resin having a mean polymerization degree of 500 and a saponification degree of 99 mol %, and stirred for acetalization. The precipitated resin was washed with water until the pH became 6, and then a neutralizing agent was added to neutralize it, and the salt formed through the neutralization was removed by washing. After dewatered, the product was dried until the volatile content could be 0.3%, thereby giving a polyvinyl acetal resin having an acetalization degree of 80 mol %.

Example 1

62.4 kg of cyclohexane as a solvent, 237.7 g of sec-butyl lithium (10.5 mass % cyclohexane solution) as an anionic polymerization initiator and 500.2 g of tetrahydrofuran as a Lewis base were put in a nitrogen-purged and dried pressure-tight container, then heated up to 50° C., and thereafter 7.91 kg of β-farnesene was added thereto and polymerized for 2 hours, subsequently, 3.12 kg of styrene (1) was added and polymerized for 1 hour, and further 4.57 kg of butadiene was added and polymerized for 1 hour. Subsequently, 25.2 g of dichlorodimethylsilane was added as a coupling agent to the polymerization reaction solution and reacted for 1 hour to give a reaction solution containing poly(β-farnesene)-polystyrene-polybutadiene-polystyrene-poly(β-farnesene) penta-block copolymer (hereinafter referred to as "block copolymer (P1)"). A palladium carbon (amount of supported palladium: 5% by mass) was added as a hydrogenation catalyst to the reaction solution in an amount of 5% by mass relative to the block copolymer (P1), and reacted under a hydrogen pressure of 2 MPa and at 150° C. for 10 hours. After cooling and pressure discharge, the palladium carbon was removed by filtration, and the filtrate was concentrated and further dried in vacuum to give a hydrogenated poly(β-farnesene)-polystyrene-polybutadiene-polystyrene-poly(β-farnesene) penta-block copolymer (hereinafter referred to as "hydrogenated block copolymer (HP1)"). The physical properties of the hydrogenated block copolymer (HP1) were measured. The results are shown in Table 1.

Example 21

62.4 kg of a solvent, cyclohexane, 237.7 g of sec-butyl lithium (10.5 mass % cyclohexane solution) as an anionic polymerization initiator and 500.2 g of tetrahydrofuran as a Lewis base, were put in a nitrogen-purged and dried pressure-tight container, then heated up to 50° C., and thereafter 7.02 kg of β-farnesene was added thereto and polymerized for 2 hours, subsequently, 3.12 kg of styrene (1) was added and polymerized for 1 hour, and further 5.46 kg of isoprene was added and polymerized for 1 hour. Subsequently, 25.2 g of dichlorodimethylsilane was added as a coupling agent to the polymerization reaction solution and reacted for 1 hour to give a reaction solution containing poly(β-farnesene)-polystyrene-polyisoprene-polystyrene-poly(β-farnesene) penta-block copolymer (hereinafter referred to as "block copolymer (P2)"). A palladium carbon (amount of supported palladium: 5% by mass) was added as a hydrogenation catalyst to the reaction solution in an amount of 5% by mass relative to the block copolymer (P2), and reacted under a hydrogen pressure of 2 MPa and at 150° C. for 10 hours. After cooling and pressure discharge, the palladium carbon was removed by filtration, and the filtrate was concentrated and further dried in vacuum to give a hydrogenated poly(β-farnesene)-polystyrene-polyisoprene-polystyrene-poly(β-farnesene) penta-block copolymer (hereinafter referred to as "hydrogenated block copolymer (HP2)"). The physical properties of the hydrogenated block copolymer (HP2) were measured. The results are shown in Table 1.

Example 3

62.4 kg of cyclohexane as a solvent, 300.3 g of sec-butyl lithium (10.5 mass % cyclohexane solution) as an anionic polymerization initiator and 600.2 g of tetrahydrofuran a as Lewis base were put in a nitrogen-purged and dried pressure-tight container, then heated up to 50° C., and thereafter 6.92 kg of β-farnesene was added thereto and polymerized for 2 hours, subsequently, 4.68 kg of styrene (1) was added and polymerized for 1 hour, and further 4.00 kg of butadiene was added and polymerized for 1 hour. Subsequently, 31.8 g of dichlorodimethylsilane was added as a coupling agent to the polymerization reaction solution and reacted for 1 hour to give a reaction solution containing poly(β-farnesene)-polystyrene-polybutadiene-polystyrene-poly(β-farnesene) penta-block copolymer (hereinafter referred to as "block copolymer (P3)"). A palladium carbon (amount of supported palladium: 5% by mass) was added as a hydrogenation catalyst to the reaction solution in an amount of 5% by mass relative to the block copolymer (P3), and reacted under a hydrogen pressure of 2 MPa and at 150° C. for 10 hours. After cooling and pressure discharge, the palladium carbon was removed by filtration, and the filtrate was concentrated and further dried in vacuum to give a hydrogenated poly(β-farnesene)-polystyrene-polybutadiene-polystyrene-poly(β-farnesene) penta-block copolymer (hereinafter referred to as "hydrogenated block copolymer (HP3)"). The physical properties of the hydrogenated block copolymer (HP3) were measured. The results are shown in Table 1.

Comparative Example 1

62.4 kg of cyclohexane as a solvent and 53.6 g of sec-butyl lithium (10.5 mass % cyclohexane solution) as an anionic polymerization initiator were put in a nitrogen-purged and dried pressure-tight container, and heated up to 50° C., then 1.40 kg of styrene (1) was added thereto and polymerized for 1 hour, subsequently 12.79 kg of β-farnesene was added and polymerized for 2 hours, and further 1.40 kg of styrene (2) was added and polymerized for 1 hour to give a reaction solution containing polystyrene-poly(β-farnesene) polystyrene tri-block copolymer (hereinafter referred to as "block copolymer (P4)"). A palladium carbon (amount of supported palladium: 5% by mass) was added as a hydrogenation catalyst to the reaction solution in an amount of 5% by mass relative to the block copolymer (P4), and reacted under a hydrogen pressure of 2 MPa and at 150° C. for 10 hours. After cooling and pressure discharge, the palladium carbon was removed by filtration, and the filtrate was concentrated and further dried in vacuum to give a hydrogenated polystyrene-poly(β-farnesene)-polystyrene tri-block copolymer (hereinafter referred to as "hydrogenated block copolymer (HP4)"). The physical properties of the hydrogenated block copolymer (HP4) were measured. The results are shown in Table 1.

Comparative Example 21

62.4 kg of cyclohexane a solvent and 122.3 g of sec-butyl lithium (10.5 mass % cyclohexane solution) as an anionic polymerization initiator were put in a nitrogen-purged and dried pressure-tight container, and heated up to 50° C., then 1.40 kg of styrene (1) was added thereto and polymerized for 1 hour, subsequently a mixture of 6.40 kg of β-farnesene and 6.40 kg of isoprene was added thereto and polymerized for 2 hours, and further 1.40 kg of styrene (2) was added and polymerized for 1 hour to give a reaction solution containing polystyrene-poly(β-farnesene/isoprene)-polystyrene tri-block copolymer (hereinafter referred to as "block copolymer (P5)"). A palladium carbon (amount of supported palladium: 5% by mass) was added as a hydrogenation catalyst to the reaction solution in an amount of 5% by mass relative to the block copolymer (P5), and reacted under a hydrogen pressure of 2 MPa and at 150° C. for 10 hours. After cooling and pressure discharge, the palladium carbon was removed by filtration, and the filtrate was concentrated and further dried in vacuum to give a hydrogenated polystyrene-poly(β-farnesene/isoprene) tri-block copolymer (hereinafter referred to as "hydrogenated block copolymer (HP5)"). The physical properties of the hydrogenated block copolymer (HP5) were measured. The results are shown in Table 1.

Comparative Example 31

62.4 kg of cyclohexane as a solvent and 81.6 g of sec-butyl lithium (10.5 mass % cyclohexane solution) as an anionic polymerization initiator were put in a nitrogen-purged and dried pressure-tight container, and heated up to 50° C., then 1.40 kg of styrene (1) was added thereto and polymerized for 1 hour, subsequently a mixture of 4.43 kg of β-farnesene and 8.36 kg of isoprene was added thereto and polymerized for 2 hours, and further 1.40 kg of styrene (2) was added and polymerized for 1 hour to give a reaction solution containing polystyrene-poly(β-farnesene/isoprene)-polystyrene tri-block copolymer (hereinafter referred to as "block copolymer (P6)"). A palladium carbon (amount of supported palladium: 5% by mass) was added as a hydrogenation catalyst to the reaction solution in an amount of 5% by mass relative to the block copolymer (P6), and reacted under a hydrogen pressure of 2 MPa and at 150° C. for 10 hours. After cooling and pressure discharge, the palladium carbon was removed by filtration, and the filtrate was concentrated and further dried in vacuum to give a hydrogenated polystyrene-poly(β-farnesene/isoprene) tri-block copolymer (hereinafter referred to as "hydrogenated block copolymer (HP6)"). The physical properties of the hydrogenated block copolymer (HP6) were measured. The results are shown in Table 1.

Comparative Example 41

62.4 kg of cyclohexane as a solvent and 122.3 g of sec-butyl lithium (10.6 mass % cyclohexane solution) as an anionic polymerization initiator were put in a nitrogen-purged and dried pressure-tight container, and heated up to 50° C., then 1.40 kg of styrene (1) was added thereto and polymerized for 1 hour, subsequently a mixture of 7.13 kg of β-farnesene and 5.66 kg of butadiene was added thereto and polymerized for 2 hours, and further 1.40 kg of styrene (2) was added and polymerized for 1 hour to give a reaction solution containing polystyrene-poly(β-farnesene/butadiene)-polystyrene tri-block copolymer (hereinafter referred to as "block copolymer (P7)"). A palladium carbon (amount of supported palladium: 5% by mass) was added as a hydrogenation catalyst to the reaction solution in an amount of 5% by mass relative to the block copolymer (P7), and reacted under a hydrogen pressure of 2 MPa and at 150° C. for 10 hours. After cooling and pressure discharge, the palladium carbon was removed by filtration, and the filtrate was concentrated and further dried in vacuum to give a hydrogenated polystyrene-poly(β-farnesene/butadiene) tri-block copolymer (hereinafter referred to as "hydrogenated block copolymer (HP7)"). The physical properties of the hydrogenated block copolymer (HP7) were measured. The results are shown in Table 1.

Reference Example 11

62.4 kg of cyclohexane as a solvent, 163.1 g of sec-butyl lithium (10.5 mass % cyclohexane solution) as an anionic polymerization initiator and 360.3 g of tetrahydrofuran as a Lewis base were put in a nitrogen-purged and dried pressure-tight container, and heated up to 50° C., then 2.08 kg of styrene (1) was added thereto and polymerized for 1 hour, subsequently 16.64 kg of isoprene was added and polymerized for 2 hours, and further 2.08 kg of styrene (2) was added and polymerized for 1 hour to give a reaction solution containing polystyrene-polyisoprene-polystyrene tri-block copolymer (hereinafter referred to as "block copolymer (P8)"). A palladium carbon (amount of supported palladium: 5% by mass) was added as a hydrogenation catalyst to the reaction solution in an amount of 5% by mass relative to the block copolymer (P8), and reacted under a hydrogen pressure of 2 MPa and at 150° C. for 10 hours. After cooling and pressure discharge, the palladium carbon was removed by filtration, and the filtrate was concentrated and further dried in vacuum to give a hydrogenated polystyrene-polyisoprene-polystyrene tri-block copolymer (hereinafter referred to as "hydrogenated block copolymer (HP8)"). The physical properties of the hydrogenated block copolymer (HP8) were measured. The results are shown in Table 1.

Reference Example 2

62.4 kg of cyclohexane as a solvent and 210.6 g of sec-butyl lithium (10.6 mass % cyclohexane solution) as an anionic polymerization initiator were put in a nitrogen-purged and dried pressure-tight container, and heated up to 50° C., then 1.88 kg of styrene (1) was added thereto and polymerized for 1 hour, subsequently 17.05 kg of isoprene was added and polymerized for 2 hours, and further 1.88 kg of styrene (2) was added and polymerized for 1 hour to give a reaction solution containing polystyrene-polyisoprene-polystyrene tri-block copolymer (hereinafter referred to as "block copolymer (P9)"). A palladium carbon (amount of supported palladium: 5% by mass) was added as a hydrogenation catalyst to the reaction solution in an amount of 5% by mass relative to the block copolymer (P9), and reacted under a hydrogen pressure of 2 MPa and at 150° C. for 10 hours. After cooling and pressure discharge, the palladium carbon was removed by filtration, and the filtrate was concentrated and further dried in vacuum to give a hydrogenated polystyrene-polyisoprene-polystyrene tri-block copolymer (hereinafter referred to as "hydrogenated block copolymer (HP9)"). The physical properties of the hydrogenated block copolymer (HP9) were measured. The results are shown in Table 1.

TABLE 1

| | | | Example | | | Comparative Example | |
|---|---|---|---|---|---|---|---|
| | | | 1 | 2 | 3 | 1 | 2 |
| | | Hydrogenated Block Copolymer | (HP1) | (HP2) | (HP3) | (HP4) | (HP5) |
| Amount Used (kg) | | Cyclohexane | 62.4 | 62.4 | 62.4 | 62.4 | 62.4 |
| | | Sec-butyl lithium (10.5 mass % cyclohexane solution) | 0.2377 | 0.2377 | 0.3003 | 0.0535 | 0.1223 |
| | | Styrene (1) | 3.12 | 3.12 | 4.68 | 1.40 | 1.40 |
| | | Styrene (2) | — | — | — | 1.40 | 1.40 |
| | | β-farnesene | 7.91 | 7.02 | 6.92 | 12.79 | 6.40 |
| | | Butadiene | 4.57 | — | 4.00 | — | — |
| | | Isoprene | — | 5.46 | — | — | 6.40 |
| | | Tetrahydrofuran | 0.5002 | 0.5002 | 0.6002 | — | — |
| | | Dichloradimethylsilane | 0.0252 | 0.0252 | 0.0318 | — | — |
| | | Amount of farnesene in polymer block (B) (mass %) | 100 | 100 | 100 | 100 | 50 |
| | | (C)/(B) [ratio by mass] | 37/63 | 44/56 | 37/63 | — | — |
| | | (A)/(A) + (B) + (C)) [ratio by mass] | 20/100 | 20/100 | 30/100 | 18/100 | 18/100 |
| | | Polymer skeleton | *1 | *2 | *1 | *3 | *4 |
| Physical Properties | | Peak top molecular weight of polymer block (A) | 8,000 | 8,000 | 9,500 | 16,000 | 7,000 |
| | | Peak top molecular weight of polymer block (B) | 21,100 | 18,600 | 14,200 | 161,000 | 82,800 |
| | | Peak top molecular weight of polymer block (C) | 44,000 | 42,800 | 30,400 | — | — |
| | | Peak top molecular weight of hydrogenated block copolymer [Mp] | 95,600 | 92,200 | 73,000 | 203,900 | 120,000 |
| | | Molecular weight distribution of hydrogenated block copolymer [Mw/Mn] | 1.32 | 1.28 | 1.24 | 1.23 | 1.05 |
| | | Hydrogenation rate of hydrogenated block copolymer (%) | 92.8 | 93.5 | 93.5 | 92.8 | 98.7 |
| | | Order-disorder transition temperature (ODT) of hydrogenated block copolymer (° C.) | 230 | 220 | 280 | 335 | 315 |

| | | | Comparative Example | | Reference Example | |
|---|---|---|---|---|---|---|
| | | | 3 | 4 | 1 | 2 |
| | | Hydrogenated Block Copolymer | (HP6) | (HP7) | (HP8) | (HP9) |
| Amount Used (kg) | | Cyclohexane | 62.4 | 62.4 | 62.4 | 62.4 |
| | | Sec-butyl lithium (10.5 mass % cyclohexane solution) | 0.0815 | 0.1223 | 0.1631 | 0.2106 |
| | | Styrene (1) | 1.40 | 1.40 | 2.08 | 1.88 |
| | | Styrene (2) | 1.40 | 1.40 | 2.08 | 1.88 |
| | | β-farnesene | 4.43 | 7.12 | — | — |
| | | Butadiene | — | 5.66 | — | — |
| | | Isoprene | 8.36 | — | 16.64 | 17.06 |
| | | Tetrahydrofuran | — | — | 0.3603 | — |
| | | Dichloradimethylsilane | — | — | — | — |
| | | Amount of farnesene in polymer block (B) (mass %) | 35 | 56 | 0 | 0 |
| | | (C)/(B) [ratio by mass] | — | — | — | — |
| | | (A)/(A) + (B) + (C)) [ratio by mass] | 18/100 | 18/100 | 20/100 | 18/100 |
| | | Polymer skeleton | *4 | *5 | *6 | *6 |
| Physical Properties | | Peak top molecular weight of polymer block (A) | 10,500 | 7,000 | 8,100 | 5,500 |
| | | Peak top molecular weight of polymer block (B) | 131,000 | 86,000 | — | — |
| | | Peak top molecular weight of polymer block (C) | — | — | 106,300 | 77,400 |
| | | Peak top molecular weight of hydrogenated block copolymer [Mp] | 152,000 | 125,500 | 107,000 | 97,000 |
| | | Molecular weight distribution of hydrogenated block copolymer [Mw/Mn] | 1.08 | 1.08 | 1.07 | 1.03 |

TABLE 1-continued

| | | | | |
|---|---|---|---|---|
| Hydrogenation rate of hydrogenated block copolymer (%) | 99.4 | 99.0 | 85.1 | 99.0 |
| Order-disorder transition temperature (ODT) of hydrogenated block copolymer (° C.) | 300 | 320 | 320 | 220 |

*1: Poly(β-farnesene)-polystyrene-polybutadiene-polystyrene-poly(β-farnesene) penta-block copolymer
*2: Poly(β-farnesene)-polystyrene-polyisoprene-polystyrene-poly(β-farnesene) penta-block copolymer
*3: Polystyrene-poly(β-farnesene)-polystyrene tri-block copolymer
*4: Polystyrene-poly(β-farnesene/isoprene)-polystyrene tri-block copolymer
*5: Polystyrene-poly(β-farnesene/butadiene)-polystyrene tri-block copolymer
*6: Polystyrene-polyisoprene-polystyrene tri-block copolymer As shown in Table 1, the hydrogenated block copolymers (HP1 to 3) of Examples 1 to 3 all had ODT of lower than 29° C. On the other hand, the hydrogenated block copolymers (HP4 to 7) of Comparative Examples 1 to 4 differ from those of the present invention in point of the polymer skeleton, that is, the former do not have the polymer block (B) at the terminal, therefore resulting in that ODT thereof is 300° C. or higher.

Example 4

Through co-extrusion according to a T-die extrusion method, a laminate was produced to have a substrate layer of a block polypropylene "PC684S" (manufactured by SunAllomer Ltd.) having a thickness of 30 μm and have an adhesive layer of the hydrogenated block copolymer (HP1) having a thickness of 10 μm. The resultant laminate was evaluated as above. The results are shown in Table 2.

Examples 5, 6, Comparative Examples 5 to 8

According to the same operation as in Example 4 except that the hydrogenated block copolymers (HP2) to (HP7) as in Table 2 were used as the adhesive layer, laminates were produced. The resultant laminates were evaluated as above. The results are shown in Table 2.

Examples 7 to 10

The hydrogenated block copolymer (HP1), a random polypropylene "Prime Polypro F327" (manufactured by Prime Polymer Co., Ltd.), a tackifier resin "Alkon P-125" (manufactured by Arakawa Chemical Industries, Ltd.) and a hydrogenated paraffinic oil "Diana Process Oil PW-90" (manufactured by Idemitsu Kosan Co., Ltd.) were blended in the ratio shown in Table 2, and melt-kneaded at 200° C. using a twin-screw extruder to produce a hydrogenated block copolymer composition.

According to the same operation as in Example 4 except that the hydrogenated block copolymer composition was used as the adhesive layer, a laminate was produced. The resultant laminate was evaluated as above. The results are shown in Table 2.

Comparative Examples 9 to 12

According to the same operation as in Examples 7 to 10 except that the hydrogenated block copolymer (HP4) was used in place of the hydrogenated block copolymer (HP1), laminates were produced. The resultant laminates were evaluated as above. The results are shown in Table 2.

TABLE 2

| | | Example | | | | | | | Comparative Example | | | | | | | |
|---|---|---|---|---|---|---|---|---|---|---|---|---|---|---|---|---|
| | | 4 | 5 | 6 | 7 | 8 | 9 | 10 | 5 | 6 | 7 | 8 | 9 | 10 | 11 | 12 |
| Formulation (pts. mass) | Hydrogenated block copolymer (HP1) | 100 | | | 90 | 90 | 90 | 80 | | | | | | | | |
| | Hydrogenated block copolymer (HP2) | | 100 | | | | | | | | | | | | | |
| | Hydrogenated block copolymer (HP3) | | | 100 | | | | | | | | | | | | |
| | Hydrogenated block copolymer (HP4) | | | | | | | | 100 | | | | 90 | 90 | 90 | 80 |
| | Hydrogenated block copolymer (HP5) | | | | | | | | | 100 | | | | | | |
| | Hydrogenated block copolymer (HP6) | | | | | | | | | | 100 | | | | | |
| | Hydrogenated block copolymer (HP7) | | | | | | | | | | | 100 | | | | |
| | Random polypropylene | | | | 10 | | 10 | | | | | | 10 | | 10 | |
| | Tackifier resin | | | | | 10 | 10 | | | | | | | 10 | 10 | |
| | Hydrogenated paraffinic oil | | | | | | | 10 | | | | | | | 10 | |
| Evaluation | Coextrusion moldability | 3 | 3 | 3 | 3 | 3 | 3 | 3 | 1 | 2 | 2 | 2 | 1 | 1 | 1 | 1 |
| | Peel strength (i) (N/25 mm) | 12.5 | 13.1 | 9.8 | 10.8 | 13.8 | 12.9 | 11.0 | — | 7.2 | 4.1 | 6.4 | — | — | — | — |
| | Draw resonance (mN) | 1.3 | 1.6 | 2.5 | 1.1 | 1.4 | 1.1 | 0.9 | — | 4.0 | 3.6 | 4.1 | — | — | — | — |
| | Melt extendibility (m/min) | 20 | 20 | 16 | 24 | 20 | 18 | 22 | <2 | 14 | 14 | 14 | <2 | <2 | <2 | <2 |

As shown in Table 2, the cases where the hydrogenated block copolymer (HP1 to 3) falling within the range of the present invention is used alone as in Examples 4 to 6 or is used as a hydrogenated block copolymer composition containing the other component as in Examples 7 to 10 all showed excellent results in all the coextrusion moldability, the peel strength, the draw resonance and the melt extendibility.

On the other hand, Comparative Examples 5 to 12, in which the hydrogenated block copolymer (HP4 to 7) not having the polymer skeleton of the present invention was used, were all inferior to Examples 4 to 10 in point of all the physical properties. In particular, in Comparative Examples 5, 9 to 12, the coextrusion moldability was extremely bad and the molten resin could not be drawn out to the condition of 10 m/min, and therefore could not be evaluated in point of draw resonance. In addition, in these, the adhesive layer of the laminate cracked and could not be adhered to the adherend, and therefore the laminate could not be evaluated for peel strength.

As obvious from these results, the hydrogenated block copolymer of the present invention and the hydrogenated block copolymer composition using the hydrogenated block copolymer can be favorably used for laminates, especially for protective films.

Examples and Comparative Examples Relating to Film

Example 11

The hydrogenated block copolymer (HP1) was extruded according to a T-die extrusion method into a film having a thickness of 50 μm. The resultant film was evaluated as above. The results are shown in Table 3.

Examples 12, 13, Comparative Examples 13 to 16

Films were produced according to the same operation as in Example 11 except that the hydrogenated block copolymer (HP2) to (HP7) shown in Table 3 was used. The resultant films were evaluated as above. The results are shown in Table 3.

Examples 14 to 16, 24 and 25

The hydrogenated block copolymer (HP1), the polar group-containing polyolefin polymer obtained in Production Example 1, the polyvinyl acetal resin obtained in Production Example 2, an ethylene-methyl acrylate copolymer "Elvaloy AC1820" (manufactured by DuPont-Mitsui Polychemicals Co., Ltd.), and the hydrogenated block copolymer (HP8) were blended in the ratio shown in Table 3, and melt-extruded at 230° C. using a twin-screw extruder to produce a hydrogenated block copolymer composition.

According to the same operation as in Example 11 except that the above hydrogenated block copolymer composition was used, films were produced. The resultant films were evaluated as above. The results are shown in Table 3.

Comparative Examples 17 to 19, 28 and 29

Films were produced according to the same operation as in Examples 14 to 16, 24 and 25 except that the hydrogenated block copolymer (HP4) was used in place of the hydrogenated block copolymer (HP1). The resultant films were evaluated as above. The results are shown in Table 3.

TABLE 3

| | | Example | | | | | | | |
|---|---|---|---|---|---|---|---|---|---|
| | | 11 | 12 | 13 | 14 | 15 | 16 | 24 | 25 |
| Formulation (pts. mass) | Hydrogenated block copolymer (HP1) | 100 | | | 70 | 60 | 60 | 70 | 70 |
| | Hydrogenated block copolymer (HP2) | | 100 | | | | | | |
| | Hydrogenated block copolymer (HP3) | | | 100 | | | | | |
| | Hydrogenated block copolymer (HP4) | | | | | | | | |
| | Hydrogenated block copolymer (HP5) | | | | | | | | |
| | Hydrogenated block copolymer (HP6) | | | | | | | | |
| | Hydrogenated block copolymer (HP7) | | | | | | | | |
| | Hydrogenated block copolymer (HP8) | | | | | | | 10 | 10 |
| | Polar group-containing polyolefin polymer | | | | 10 | 10 | 10 | 20 | |
| | Polyolefin (metallocene PP) | | | | | | | | 20 |
| | Ethylene-methyl acrylate copolymer | | | | 20 | 30 | 20 | | |
| | Polyvinyl acetal | | | | | | 10 | | |
| Evaluation | Extrusion film moldability | 3 | 3 | 3 | 3 | 3 | 3 | 3 | 2 |
| | Draw resonance (mN) | 1.3 | 1.6 | 2.5 | 1.1 | 0.8 | 1.5 | 1.1 | 1.2 |
| | Melt extendibility (m/min) | 20 | 20 | 16 | 24 | 24 | 24 | 24 | 24 |
| | Peel strength (ii) (N/25 mm) PC plate | — | — | — | 55 | — | — | 109 | — |
| | PMMA plate | — | — | — | 30 | — | — | 39 | — |
| | ABS plate | — | — | — | 20 | — | — | 27 | — |
| | PA6 plate | — | — | — | 56 | — | — | 60 | — |
| | PP plate | — | — | — | 48 | — | — | 70 | — |
| | Aluminum plate | — | — | — | 90 | — | — | 100 | — |

| | | Comparative Example | | | | | | | | |
|---|---|---|---|---|---|---|---|---|---|---|
| | | 13 | 14 | 15 | 16 | 17 | 18 | 19 | 28 | 29 |
| Formulation (pts. mass) | Hydrogenated block copolymer (HP1) | | | | | | | | | |
| | Hydrogenated block copolymer (HP2) | | | | | | | | | |
| | Hydrogenated block copolymer (HP3) | | | | | | | | | |
| | Hydrogenated block copolymer (HP4) | 100 | | | | 70 | 60 | 60 | 70 | 70 |
| | Hydrogenated block copolymer (HP5) | | 100 | | | | | | | |
| | Hydrogenated block copolymer (HP6) | | | 100 | | | | | | |
| | Hydrogenated block copolymer (HP7) | | | | 100 | | | | | |

TABLE 3-continued

| | | | | | | | | | | |
|---|---|---|---|---|---|---|---|---|---|---|
| | Hydrogenated block copolymer (HP8) | | | | | | | | 10 | 10 |
| | Polar group-containing polyolefin polymer | | | | | 10 | 10 | 10 | 20 | |
| | Polyolefin (metallocene PP) | | | | | | | | | 20 |
| | Ethylene-methyl acrylate copolymer | | | | | 20 | 30 | 30 | | |
| | Polyvinyl acetal | | | | | | | 10 | | |
| Evaluation | Extrusion film moldability | 1 | 2 | 2 | 2 | 1 | 1 | 1 | 1 | 1 |
| | Draw resonance (mN) | — | 4.0 | 3.6 | 4.1 | — | — | — | — | — |
| | Melt extendibility (m/min) | <2 | 14 | 14 | 14 | <2 | <2 | <2 | <2 | <2 |
| | Peel strength (ii)   PC plate | — | — | — | — | 34 | — | — | 18 | — |
| | (N/25 mm)           PMMA plate | — | — | — | — | 30 | — | — | 26 | — |
| | ABS plate | — | — | — | — | 31 | — | — | 13 | — |
| | PA6 plate | — | — | — | — | 21 | — | — | 17 | — |
| | PP plate | — | — | — | — | 30 | — | — | 42 | — |
| | Aluminum plate | — | — | — | — | 34 | — | — | 64 | — |

As shown in Table 3, the cases where the hydrogenated block copolymer (HP1 to 8) falling within the range of the present invention is used alone as in Examples 11 to 13 or is used as a hydrogenated block copolymer composition containing the other component as in Examples 14 to 16 all showed excellent results in all the extrusion film moldability, the draw resonance and the melt extendibility.

On the other hand, Comparative Examples 13 to 19, in which the hydrogenated block copolymer (HP4 to 7) not having the polymer skeleton of the present invention was used, were all inferior to Examples 11 to 16 in point of all the physical properties. In particular, in Comparative Examples 13, 17 to 19, the extrusion moldability was extremely bad and the molten resin could not be drawn out to the condition of 10 m/min, and therefore could not be evaluated in point of draw resonance.

In Example 14 and Comparative Example 17, the film adhered to the adherend in a balanced manner, but Comparative Example 17 is inferior to Example 14 in point of film moldability, and therefore it is found that, in the former, the composition is difficult to adhere to the adherend as a film and the composition is not suitable as a decorative molding material.

In Example 24 using the hydrogenated block copolymer (HP8), the peel strength (adhesive strength to each adherend) improved, but in Comparative Example 28 similarly using the hydrogenated block copolymer (HP8), the peel strength did not increase.

Examples and Comparative Examples Relating to Nonwoven Fabric

Example 17

The hydrogenated block copolymer (HP1) was put into an extruder and melted at 310° C., then extruded out through a melt-blow nozzle having 0.3-mm orifices aligned in a line at a pitch of 0.75 mm, and at the same time, hot air at 310° C. was jetted toward the molten resin, and the melt-blown fibers were collected on a molding conveyor to give a melt-blown nonwoven fabric. The resultant melt-blown nonwoven fabric was evaluated as above. The results are shown in Table 4.

Examples 18, 19, Comparative Examples 20 to 23

Melt-blown nonwoven fabrics were produced according to the same operation as in Example 17 except that the hydrogenated block copolymer (HP2) to (HP7) shown in Table 4 was used. The resultant melt-blown nonwoven fabrics were evaluated as above. The results are shown in Table 4.

Examples 20, 21

The hydrogenated block copolymer (HP1), the polar group-containing polyolefin polymer obtained in Production Example 1, and an ethylene-methyl acrylate copolymer "Elvaloy AC1820" (manufactured by DuPont-Mitsui Polychemicals Co., Ltd.) were blended in the ratio shown in Table 4, and melt-extruded at 230° C. using a twin-screw extruder to produce a hydrogenated block copolymer composition.

According to the same operation as in Example 17 except that the above hydrogenated block copolymer composition was used, melt-blown nonwoven fabrics were produced. The resultant melt-blown nonwoven fabrics were evaluated as above. The results are shown in Table 4.

Comparative Examples 24, 26

Melt-blown nonwoven fabrics were produced according to the same operation as in Examples 20 and 21 except that the hydrogenated block copolymer (HP4) was used in place of the hydrogenated block copolymer (HP1). The resultant melt-blown nonwoven fabrics were evaluated as above. The results are shown in Table 4.

TABLE 4

| | | Example | | | | | Comparative Example | | | | | |
|---|---|---|---|---|---|---|---|---|---|---|---|---|
| | | 17 | 18 | 19 | 20 | 21 | 20 | 21 | 22 | 23 | 24 | 25 |
| Formulation (pts. mass) | Hydrogenated block copolymer (HP1) | 100 | | | 75 | 75 | | | | | | |
| | Hydrogenated block copolymer (HP2) | | 100 | | | | | | | | | |
| | Hydrogenated block copolymer (HP3) | | | 100 | | | | | | | | |
| | Hydrogenated block copolymer (HP4) | | | | | | 100 | | | | 75 | 75 |
| | Hydrogenated block copolymer (HP5) | | | | | | | 100 | | | | |
| | Hydrogenated block copolymer (HP6) | | | | | | | | 100 | | | |

TABLE 4-continued

|  |  | Example | | | | | Comparative Example | | | | | |
|---|---|---|---|---|---|---|---|---|---|---|---|---|
|  |  | 17 | 18 | 19 | 20 | 21 | 20 | 21 | 22 | 23 | 24 | 25 |
|  | Hydrogenated block copolymer (HP7) |  |  |  |  |  |  |  |  | 100 |  |  |
|  | Polar group-containing polyolefin polymer |  |  |  | 25 | 15 |  |  |  |  | 25 | 15 |
|  | Ethylene-methyl acrylate copolymer |  |  |  |  | 10 |  |  |  |  |  | 10 |
| Evaluation | Melt-blow moldability | 2 | 2 | 2 | 2 | 2 | 1 | 1 | 1 | 1 | 1 | 1 |
|  | Draw resonance (mN) | 1.3 | 1.6 | 2.5 | 0.7 | 0.9 | — | 4.0 | 3.6 | 4.1 | — | — |
|  | Melt extendibility (m/min) | 20 | 20 | 16 | 26 | 24 | <2 | 14 | 14 | 14 | <2 | <2 |

As shown in Table 4, the cases where the hydrogenated block copolymer (HP1 to 8) falling within the range of the present invention is used alone as in Examples 17 to 19 or is used as a hydrogenated block copolymer composition containing the other component as in Examples 20 to 21 all showed excellent results in all the melt-blow moldability, the draw resonance and the melt extendibility.

On the other hand, Comparative Examples 20 to 25, in which the hydrogenated block copolymer (HP4 to 7) not having the polymer skeleton of the present invention was used, were all inferior to Examples 17 to 21 in point of all the physical properties. In particular, in Comparative Examples 20, 24 and 25, the extrusion moldability was extremely bad and the molten resin could not be drawn out to the condition of 10 m/min, and therefore could not be evaluated in point of draw resonance.

Examples and Comparative Examples Relating to Adhesive

Examples 22, 23 and 26 to 29

The hydrogenated block copolymer (HP1), a tackifier resin "Alkon P-125" (manufactured by Arakawa Chemical Industries, Ltd.) and a hydrogenated paraffinic oil "Diana Process Oil PW-90" (manufactured by Idemitsu Kosan Co., Ltd.) were blended in the ratio shown in Table 5, and melt-kneaded at 200° C. using a twin-screw extruder to produce a hydrogenated block copolymer composition. The hydrogenated block copolymer composition (adhesive) was evaluated in point of the draw resonance and the melt extendibility, and the results are show in Table 5.

Further, the hydrogenated block copolymer composition was applied onto a 50 μm-thick polyethylene terephthalate film (trade name, Teijin Tetron Film G2, manufactured by Teijin DuPont Film Co., Ltd.) in a mode of hot melt coating to a thickness of 25 μm at 180° C., using a hot melt coater, and evaluated in point of the hot melt coatability. The results are shown in Table 5.

Comparative Examples 26, 27 and 30 to 32

Hydrogenated block copolymer compositions (adhesives) were produced according to the same operation as in Examples 22, 23 and 26 to 29 except that the hydrogenated block copolymer (HP4) was used in place of the hydrogenated block copolymer (HP1), and evaluated as above. The results are shown in Table 5.

TABLE 5

|  |  | Example | | | | | | Comparative Example | | | | |
|---|---|---|---|---|---|---|---|---|---|---|---|---|
|  |  | 22 | 23 | 26 | 27 | 28 | 29 | 26 | 27 | 30 | 31 | 32 |
| Formulation (pts. mass) | Hydrogenated block copolymer (HP1) | 70 | 60 | 40 | 25 | 25 | 50 |  |  |  |  |  |
|  | Hydrogenated block copolymer (HP4) |  |  |  |  |  |  | 70 | 60 | 40 |  | 25 |
|  | Hydrogenated block copolymer (HP5) |  |  |  |  |  |  |  |  |  | 40 |  |
|  | Hydrogenated block copolymer (HP9) |  |  |  |  |  | 10 |  |  |  |  |  |
|  | Tackifier resin | 10 | 10 | 40 | 50 | 25 | 10 | 10 | 10 | 40 | 40 | 50 |
|  | Hydrogenated paraffinic oil | 20 | 30 | 20 | 25 | 50 | 30 | 20 | 30 | 20 | 20 | 25 |
| Evaluation | Hot melt coatability | 2 | 2 | 2 | 2 | 2 | 2 | 1 | 1 | 1 | 1 | 1 |
|  | Draw resonance (mN) | 0.8 | 0.7 | — | — | — | 0.7 | 2.2 | 2.1 | 2.0 | — | — |
|  | Melt extendibility (m/min) | 22 | 22 | — | — | — | 26 | 4 | 6 | 8 | — | — |
|  | Melt viscosity (Pa · s) 160° C. | 84 | 51 | 6.5 | 1.3 | 0.4 | 55 | >300 | >300 | >300 | 10 | 8.5 |
|  | Melt viscosity (Pa · s) 180° C. | 30 | 16 | 3.0 | 0.7 | 0.3 | 20 | >300 | >300 | 147 | 1.8 | 1.2 |

As shown in Table 5, in the cases where the hydrogenated block copolymer (HP1) falling within the range of the present invention is used as in Examples 22 to 23, the resultant hydrogenated block copolymer composition (adhesive) is excellent in all of the hot melt coatability, the draw resonance and the melt extendibility.

On the other hand, Comparative Examples 26 to 27, in which the hydrogenated block copolymer (HP4) not having the polymer skeleton of the present invention was used, were extremely inferior to Examples 22 to 23 in point of all the physical properties.

In Examples 26 to 28 and Comparative Examples 31 to 32, the compositions could not be evaluated in point of the draw resonance and the melt extendibility owing to intense drawing down thereof.

The composition of Example 29 additionally containing the hydrogenated block copolymer (HP9) improved in point of the draw resonance and the melt extendibility, and therefore the moldability thereof improved.

Examples and Comparative Examples having the same formulation were compared, and the melt viscosity of the compositions of Examples was lower. Accordingly, it is found that the adhesives of Examples are applicable in a mode of hot melt coating in a broad range of low temperatures to high temperatures.

From the result, it is found that the hydrogenated block copolymer of the present invention and the hydrogenated block copolymer composition using the hydrogenated block copolymer are favorably usable as adhesives, especially as hot-melt adhesives.

Examples and Comparative Examples Relating to Oil Gel

Examples 30 to 34, and Comparative Examples 33 to 35

The hydrogenated block copolymer (HP1) or the hydrogenated block copolymer (HP4), and a softening agent 1 or a softening agent 2 were blended in the ratio shown in Table 6, and melt-kneaded at 200° C. using a twin-screw extruder to produce a hydrogenated block copolymer composition. The hydrogenated block copolymer composition was evaluated in point of injection moldability, shape retention, tear strength and peel strength (to polyurethane), and the results are shown in Table 6.

The softening agent 1 and the softening agent 2 are as follows.
Softening agent 1: Paraffinic process oil (Diana Process Oil PW-32 manufactured by Idemitsu Kosan Co., Ltd., kinematic viscosity at 40° C.: 31 mm$^2$/s)
Softening agent 2: Paraffinic process oil (Diana Process Oil PW-90 manufactured by Idemitsu Kosan Co., Ltd., kinematic viscosity at 40° C.: 95.54 mm$^2$/s)

As obvious from the results in Table 6, it is found that the hydrogenated block copolymer compositions of Examples are all excellent in injection moldability and shape retention. When Examples and Comparative Examples in which the blending quantities of components are the same are compared, it is found that the hydrogenated block copolymer compositions of Examples are excellent in tear strength.

In addition, when Examples and Comparative Examples in which the blending quantities of components are the same are compared, the adhesive force is on the same level but the compositions of Comparative Examples are poor in injection moldability resulting in poor appearance of the molded articles. Further, in Comparative Examples, the oil bleed is large therefore resulting in that the adhesive force to polyurethane is low.

From the above results, it is found that the hydrogenated block copolymer compositions are excellent in injection moldability and in adhesion to polyurethane, and are therefore suitable for shoe sole cushioning materials, etc.

Examples and Comparative Examples Relating to Laminate and Foamed Laminate

Examples 35 to 38, Comparative Examples 36 to 39

The components shown in Table 7 were kneaded in the mass ratio shown therein, at 160° C. for 5 minutes using a Banbury mixer, and then using a warm-up roll of two rolls, this was kneaded for 3 minutes, and using a L-shaped four-roll calender, the resultant hydrogenated block copolymer composition was stuck to the undercoated surface of a support sheet, which was formed of a fabric cloth and was undercoated, in a thickness of 0.3 mm to produce a laminate. As the softening agent, Diana Process PW-32 manufactured by Idemitsu Kosan Co., Ltd. (kinematic viscosity at 40° C. 31 mm$^2$/s) was used, and as the foaming agent (azodicarbonamide), Vinyhole AC#3 manufactured by Eiwa Kasei Co., Ltd. was used.

In Example 38 and Comparative Example 39, the resultant laminate was led to pass through a foaming kiln at a temperature of 210° C. for 2 minutes so as to foam the layer of the hydrogenated block copolymer composition, thereby producing a foamed laminate having a 0.5 mm-thick foam layer.

The sheet of the hydrogenated block copolymer obtained by calender-molding and before lamination was evaluated in point of the hardness and the calendering moldability, and the laminate and the foamed laminate were evaluated in

TABLE 6

| | | Example | | | | | Comparative Example | | |
|---|---|---|---|---|---|---|---|---|---|
| | | 30 | 31 | 32 | 33 | 34 | 33 | 34 | 35 |
| Formulation (pts. mass) | Hydrogenated block copolymer (HP1) | 90 | 80 | 70 | 50 | 80 | | | |
| | Hydrogenated block copolymer (HP4) | | | | | | 80 | 70 | 50 |
| | Softening agent 1 | 10 | 20 | 30 | 50 | | 20 | 30 | 50 |
| | Softening agent 2 | | | | | 20 | | | |
| Evaluation | Injection moldability | 3 | 3 | 3 | 3 | 3 | 1 | 2 | 3 |
| | Shape retention TD (%) | 98 | 98 | 98 | 98 | 98 | 93 | 93 | 94 |
| | Shape retention MD (%) | 95 | 95 | 95 | 95 | 95 | 90 | 90 | 91 |
| | Tear strength TD (kN/m) | 7.5 | 5.2 | 3.1 | 1.2 | 5.3 | 3.0 | 1.7 | 0.7 |
| | Tear strength MD (kN/m) | 7.8 | 5.3 | 3.3 | 1.0 | 5.3 | 2.1 | 1.4 | 0.7 |
| | Peel strength (to polyurethane) | — | 2 | — | — | — | 2 | — | 1 | point of the adhesive force, the bleed-out inhibitory capability and the foaming moldability. The results are shown in Table 7.

<Hydrogenated Block Copolymer (I)>
Hydrogenated block copolymer (I-1) and (I-2) of Production Examples 3 and 4 given below.

TABLE 7

|  | Example | | | | Comparative Example | | | |
| --- | --- | --- | --- | --- | --- | --- | --- | --- |
|  | 35 | 36 | 37 | 38 | 36 | 37 | 38 | 39 |
| Layer (1) Hydrogenated block copolymer composition | | | | | | | | |
| Hydrogenated block copolymer (HP1) | 100 | 100 | 100 | 100 | | | | |
| Hydrogenated block copolymer (HP4) | | | | | 100 | 100 | 100 | 100 |
| Softening agent (process oil) | | | 50 | | | | 50 | |
| Foaming agent (sodium hydrogen carbonate) | | | | 3 | | | | 3 |
| Fabric (2) | | | | | | | | |
| Material | cotton | cashmere | cotton | cotton | cotton | cashmere | cotton | cotton |
| (unit: mass %) | (100) | (100) | (100) | (100) | (100) | (100) | (100) | (100) |
| Basis weight (g/m$^2$) | 216 | 248 | 216 | 216 | 216 | 248 | 216 | 216 |
| Thickness (mm) | 0.70 | 0.87 | 0.70 | 0.70 | 0.70 | 0.87 | 0.70 | 0.70 |
| Evaluation Results | | | | | | | | |
| Hardness (type A) | 16 | 16 | 3 | 16 | 7 | 7 | 3 | 7 |
| Adhesive force (N/25 mm) | 45.3 | 42.3 | 16.2 | 45.3 | 40.3 | 39.4 | 14.8 | 40.3 |
| Bleed-out inhibitory capability | A | A | A | A | A | A | A | A |
| Calendering moldability | A | A | A | A | B | B | B | B |
| Foaming moldability | — | — | — | A | — | — | — | B |

From the results in Table 7, it is found that the laminates of Examples 35 to 38 are more excellent in calendering moldability than the laminates of Comparative Examples 36 to 39. Further, the foamed laminate of Example 38 is more excellent in foaming moldability than the foamed laminate of Comparative Example 39.

Examples and Comparative Examples Relating to Nonwoven Fabric

Examples 39 to 41, Comparative Examples 40 to 42

The hydrogenated block copolymer (HP1) or the hydrogenated block copolymer (HP4) and a polyolefin resin were blended in the ratio shown in Table 8, and melt-kneaded at 200° C. using a twin-screw extruder to produce a hydrogenated block copolymer composition. The hydrogenated block copolymer composition was evaluated in point of draw resonance and flexibility, and the results are shown in Table 6.

As the polyolefin rein, Prime Polypro S119 (MFR=60 g/min) manufactured by Primer Polymer Co., Ltd. was used.

<Hydrogenated Block Copolymer (I')>
Hydrogenated block copolymer (I'-1) to (I'-8) of Production Examples 5 to 12 given below.

<Polystyrene Resin (II)>
GPPS (trade name: 679, manufactured by PS Japan Corporation, MFR: 18 g/10 min, weight-average molecular weight: 199,000)

<Softening Agent (III)>
Hydrogenated paraffinic process oil (trade name: Diana Process Oil PW-90, manufactured by Idemitsu Kosan Co., Ltd., kinematic viscosity at 40° C.: 95.54 mm$^2$/s)

The details of the measurement methods in Production Examples are as follows.

(1) Measurement of Molecular Weight Distribution and Peak Top Molecular Weight (Mp)

The peak top molecular weight (Mp) and the molecular weight distribution (Mw/Mn) of the hydrogenated block copolymer (I) or (I') and a styrene block were determined in terms of a standard polystyrene-equivalent molecular weight thereof through GPC (gel permeation chromatography), and from the position of the peak top of the molecular weight distribution, the peak top molecular weight (Mp) was obtained. The measurement apparatus and condition are as follows.

TABLE 8

|  |  | Example | | | Comparative Example | | |
| --- | --- | --- | --- | --- | --- | --- | --- |
|  |  | 39 | 40 | 41 | 40 | 41 | 42 |
| Formulation (pts. mass) | Hydrogenated block copolymer (HP1) | 10 | 20 | 30 | | | |
|  | Hydrogenated block copolymer (HP4) | | | | 10 | 20 | 30 |
|  | Polyolefin resin | 90 | 80 | 70 | 90 | 80 | 70 |
| Evaluation | Draw resonance (mN) | 0.5 | 0.6 | 0.9 | 3.6 | 3.8 | 4.2 |
|  | Flexibility | B | A | A | B | A | A |

Examples and Comparative Examples Relating to Elastic Member

The components used in Examples and Comparative Examples relating to elastic members are as follows.

Apparatus: GPC apparatus by Tosoh Corporation "GPC8020"
Separation column: "TSKgel G4000HXL" by Tosoh Corporation
Detector: "RI-8020" by Tosoh Corporation Solvent: Tetrahydrofuran
Solvent flow rate: 1.0 ml/min
Sample concentration: 5 mg/10 ml
Column temperature: 40° C.

(2) Method for Measurement of Hydrogenation Rate

In Examples and Comparative Examples, the block copolymer (P) and the block copolymer after hydrogenation (hydrogenated block copolymer) (I) or (I') were individually dissolved in a solvent of heavy chloroform, and using "Lambda-500" by JEOL Ltd., the resultant solution was analyzed for $^1$H-NMR at 50° C. The hydrogenation rate of the polymer blocks (b) and (c) in the hydrogenated block copolymer (I) was calculated from the peak of the proton of the carbon-carbon double bond appearing at 4.5 to 6.0 ppm in the resultant spectrum, according to the following equation.

Hydrogenation Rate (mol %)={1−(molar number of carbon-carbon double bond contained in 1 mol of hydrogenated block copolymer (I) or (I'))/(molar number of carbon-carbon double bond contained in 1 mol of block copolymer (P))}×100

(3) Method for Measurement of Hysteresis Loss Rate and 100% Modulus

The hydrogenated block copolymer (I) or (I') and the thermoplastic elastomer composition obtained in Examples and Comparative Examples were individually compression-molded at 240° C. and under a load of 10 MPa for 3 minutes to prepare a sheet having a thickness of 0.5 mm. Strip specimens each having a width of 25 mm and a length of 150 mm were blanked out of the resultant sheet to be blanked specimens. However, in evaluating the hysteresis loss rate and the 100% modulus of a melt blown nonwoven fabric, the once prepared nonwoven fabric was again melted and formed into a sheet, and specimens each having the above-mentioned size were blanked out of the sheet to be blanked specimens.

Using a tensile tester "3345 Model" manufactured by Instron Co., Ltd., the specimen was 100% expanded at a test temperature of 23° C. and at a test speed of 100 mm/min with a chuck-to-chuck distance of 40 mm, and thereafter shrunk down to 0% at a test speed of 100 mm/min. This operation was repeated for two cycles.

The maximum tensile stress at 100% expansion in the going 1st cycle was referred to as 100% modulus.

In addition, 100% expansion energy in going in the 1st cycle [A1 (going 100%)] and 100% expansion energy in returning [B1 (returning 100%)], and 100% expansion energy in going in the 2nd cycle (A2 (going 100%)), 100% expansion energy in returning [B2 (returning 100%)] were measured. According to the following expressions, the 1st cycle hysteresis loss rate and the 2nd cycle hysteresis loss rate were determined to be the indices for elasticity restoration. A lower value of the expression means excellent elasticity restoration.

1st cycle hysteresis loss rate $(L_1)=[(A1-B1)/A1] \times 100$

2nd cycle hysteresis loss rate $(L_2)=[(A2-B2)/A2] \times 100$ (4) Basis Weight of Nonwoven Fabric (g/m$^2$)

According to JIS L 1906, three specimens of 20 cm length×20 cm width each were collected from a nonwoven fabric (width 1 m), and the mass of each specimen was weighed using an electronic balance. A mean value of the data at 3 points was divided by the area 400 cm$^2$ of the specimen to calculate the mass per unit area to be the basis weight of the nonwoven fabric.

(5) Mean Fiber Diameter of Nonwoven Fabric (μm)

Using a scanning electron microscope, a nonwoven fabric was photographed with 300 magnification at desired points to measure the fiber diameter of 50 fibers. A mean value of the data was referred to as a mean fiber diameter.

(6) Method for Evaluation of Melt Blowing Moldability

The hydrogenated block copolymer (I) or (I') or the thermoplastic elastomer composition obtained in Examples and Comparative Examples was formed into a melt-blown nonwoven fabric according to the method to be mentioned below, and depending on the results, the samples were evaluated in point of the melt-blowing moldability in the following three ranks.

A: A good nonwoven fabric was formed, and the productivity is good.

B: A nonwoven fabric was formed but gave many fluffs, and the productivity is poor.

C: A nonwoven fabric was not formed.

<Hydrogenated Block Copolymer (I)>

Production Example 3

50.0 kg of cyclohexane as a solvent, 190.6 g of sec-butyl lithium (10.5 mass % cyclohexane solution) (sec-butyl lithium 20.0 g) as an anionic polymerization initiator and 400.0 g of tetrahydrofuran as a Lewis base were put in a nitrogen-purged and dried pressure-tight container, then heated up to 50° C., and thereafter 6.34 kg of β-farnesene was added thereto and polymerized for 2 hours, subsequently, 2.50 kg of styrene (1) was added and polymerized for 1 hour, and further 3.66 kg of butadiene was added and polymerized for 1 hour. Subsequently, 20.0 g of dichlorodimethylsilane was added as a coupling agent to the polymerization reaction solution and reacted for 1 hour to give a reaction solution containing poly(β-farnesene)-polystyrene-polybutadiene-polystyrene-poly(β-farnesene) penta-block copolymer. A palladium carbon (amount of supported palladium: 5% by mass) was added as a hydrogenation catalyst to the reaction solution in an amount of 5% by mass relative to the block copolymer, and reacted under a hydrogen pressure of 2 MPa and at 0.150° C. for 10 hours. After cooling and pressure discharge, the palladium carbon was removed by filtration, and the filtrate was concentrated and further dried in vacuum to give a hydrogenated poly(β-farnesene)-polystyrene-polybutadiene-polystyrene-poly(β-farnesene) penta-block copolymer (hereinafter referred to as "hydrogenated block copolymer (I-1)"). The physical properties of the hydrogenated block copolymer (I-1) were measured. The results are shown in Table 9.

Production Example 4

A hydrogenated poly(β-farnesene)-polystyrene-polyisoprene-polystyrene-poly(β-farnesene) penta-block copolymer (hereinafter referred to as "hydrogenated block copolymer (I-2)") was produced in the same manner as in Production Example 3 except that isoprene was used in place of butadiene, use of tetrahydrofuran was omitted, and the components were blended according to the formulation shown in Table 9. The resultant hydrogenated block copolymer (1-2) was evaluated as above. The results are shown in Table 9.

<Hydrogenated Block Copolymer (I')>

Production Example 5

50.0 kg of cyclohexane as a solvent and 16.9 g of sec-butyl lithium (10.5 mass % cyclohexane solution) (sec-butyl lithium 1.8 g) as an anionic polymerization initiator were put in a nitrogen-purged and dried pressure-tight container, then heated up to 50° C., and thereafter 2.22 kg of styrene (1) was added thereto and polymerized for 1 hour, thereafter 1.11 kg of β-farnesene was added and polymerized for 2 hours, and further 2.22 kg of styrene (2) was added and polymerized for 1 hour, thereby giving a reaction solution containing polystyrene-poly(β-farnesene)-polystyrene tri-block copolymer. A palladium carbon (amount of supported palladium: 5% by mass) was added as a hydrogenation catalyst to the reaction solution in an amount of 5% by mass relative to the block copolymer, and reacted under a hydrogen pressure of 2 MPa and at 150° C. for 10 hours. After cooling and pressure discharge, the palladium carbon was removed by filtration, and the filtrate was concentrated and further dried in vacuum to give a hydrogenated polystyrene-poly(β-farnesene)-polystyrene tri-block copolymer (hereinafter referred to as "hydrogenated block copolymer (I'-1)"). The resultant hydrogenated block copolymer (I'-1) was evaluated as above. The results are shown in Table 10.

Production Examples 6, 7

Hydrogenated block copolymers (I'-2) and (I'-3) were produced in the same manner as in Production Example 5 except that isoprene was blended in place of β-farnesene and the components were blended according to the formulation shown in Table 10. The resultant hydrogenated block copolymers (I'-2) and (I'-3) were evaluated as above. The results are shown in Table 10.

Production Example 8

A hydrogenated block copolymer (I'-4) was produced in the same manner as in Production Example 5 except that butadiene was blended in place of β-farnesene, tetrahydrofuran was mixed in the solvent cyclohexane, and the components were blended according to the formulation shown in Table 10. The resultant hydrogenated block copolymer (I'-4) was evaluated as above. The results are shown in Table 10.

Production Examples 9 to 12

Hydrogenated block copolymers (I'-5) to (I'-8) were produced in the same manner as in Production Example 5 except that a mixture of isoprene and butadiene was blended in place of β-farnesene and the components were blended according to the formulation shown in Table 10. The resultant hydrogenated block copolymers (I'-5) to (I'-8)) were evaluated as above. The results are shown in Table 10.

TABLE 9

| | | Production Example | |
|---|---|---|---|
| | | 3 | 4 |
| Block Copolymer | | (I-1) | (I-2) |
| Amount Used [kg] | Cyclohexane | 50.0 | 50.0 |
| | Sec-butyl lithium (10.5 mass % cyclohexane solution) | 0.1905 | 0.1905 |
| | Styrene (1) | 2.50 | 2.50 |
| | Styrene (2) | | |
| | β-farnesene | 6.34 | 5.77 |
| | Isoprene | | 4.23 |
| | Butadiene | 3.66 | |
| | Tetrahydrofuran | 0.40 | |
| | Dichlorodimethylsilane | 0.02 | 0.02 |
| (a)/(b) [ratio by mass] (*1) | | 20/80 | 20/80 |
| (b1)/(b) [% by mass] (*2) | | 63/37 | 58/42 |
| Polymer skeleton (*3) | | F-St-Bd-St-F | F-St-IP-St-F |
| Physical Properties | Peak top molecular weight of styrene block (Mp) | 8,000 | 8,000 |
| | Peak top molecular weight of hydrogenated block copolymer (Mp) | 102,000 | 95,600 |
| | Molecular weight distribution (Mw/Mn) | 1.50 | 1.47 |
| | Hydrogenation rate (%) (*4) | 93.0 | 92.2 |

(*1) (a)/(b) is ratio by mass of the sum total of the structural unit (a) to the sum total of the structural unit (b).
(*2) (b1)/(b) shows the content of the farnesene-derived structural unit (b1) in the sum total of the conjugated diene-derived structural unit (b).
(*3) F-St-Bd-St-F is poly(β-farnesene)-polystyrene-polybutadiene-polystyrene-poly(β-farnesene) penta-block copolymer. F-St-IP-St-F is poly(β-farnesene)-polystyrene-polyisoprene-polystyrene-poly(β-farnesene) penta-block copolymer.
(*4) Hydrogenation rate is the hydrogenation rate of the carbon-carbon double bond in the conjugated diene-derived structural unit (b).

TABLE 10

| | | Production Example | | | |
|---|---|---|---|---|---|
| | | 5 | 6 | 7 | 8 |
| | Block Copolymer | (I'-1) | (I'-2) | (I'-3) | (I'-4) |
| Amount Used [kg] | Cyclohexane | 50.0 | 50.0 | 50.0 | 50.0 |
| | Sec-butyl lithium (10.5 mass % cyclohexane solution) | 0.0169 | 0.1429 | 0.1247 | 0.1633 |
| | Styrene (1) | 2.22 | 1.87 | 1.12 | 1.87 |
| | Styrene (2) | 2.22 | 1.87 | 1.12 | 1.87 |
| | β-farnesene | 1.11 | | | |
| | Isoprene | | 8.75 | 10.25 | |
| | Butadiene | | | | 8.75 |
| | Tetrahydrofuran | | | | 0.072 |
| | (a)/(b) [ratio by mass] (*1) | 80/20 | 30/70 | 13/82 | 30/70 |
| | (bI)/(b) [% by mass] (*2) | 100/0 | 0/100 | 0/100 | 0/100 |
| | Polymer skeleton (*3) | St-F-St | St-Ip-St | St-Ip-St | St-Bd-St |
| Physical Properties | Peak top molecular weight of styrene block (Mp) | 80,000 | 8,000 | 5,500 | 7,000 |
| | Peak top molecular weight of hydrogenated block copolymer (Mp) | 203,136 | 82,000 | 94,000 | 76,900 |
| | Molecular weight distribution (Mw/Mn) | 1.26 | 1.05 | 1.03 | 1.13 |
| | Hydrogenation rate (%) (*4) | 95.6 | 98.5 | 98.4 | 99.0 |

TABLE 10-continued

|  |  | Production Example | | | |
|---|---|---|---|---|---|
|  |  | 9 | 10 | 11 | 12 |
|  | Block Copolymer | (I'-5) | (I'-6) | (I'-7) | (I'-8) |
| Amount Used [kg] | Cyclohexane | 50.0 | 50.0 | 50.0 | 50.0 |
|  | Sec-butyl lithium (10.5 mass % cyclohexane solution) | 0.1394 | 0.1154 | 0.0310 | 0.0224 |
|  | Styrene (1) | 1.87 | 2.50 | 1.32 | 1.32 |
|  | Styrene (2) | 1.87 | 2.50 | 1.32 | 1.32 |
|  | β-farnesene |  |  |  |  |
|  | Isoprene | 4.88 | 3.73 | 3.44 | 3.44 |
|  | Butadiene | 3.87 | 3.77 | 2.73 | 2.73 |
|  | Tetrahydrofuran |  |  |  |  |
|  | (a)/(b) [ratio by mass] (*1) | 30/70 | 40/60 | 30/70 | 30/70 |
|  | (bI)/(b) [% by mass] (*2) | 0/100 | 0/100 | 0/100 | 0/100 |
|  | Polymer skeleton (*3) | St-(Ip/Bd)-St | St-(Ip/Bd)-St | St-(Ip/Bd)-St | St-(Ip/Bd)-St |
| Physical Properties | Peak top molecular weight of styrene block (Mp) | 8,200 | 13,200 | 26,000 | 36,000 |
|  | Peak top molecular weight of hydrogenated block copolymer (Mp) | 82,500 | 99,500 | 285,000 | 380,000 |
|  | Molecular weight distribution (Mw/Mn) | 1.06 | 1.07 | 1.06 | 1.07 |
|  | Hydrogenation rate (%) (*4) | 97.8 | 98.0 | 97.8 | 98.0 |

(*1) (a)/(b) is ratio by mass of the sum total of the structural unit (a) to the sum total of the structural unit (b).
(*2) (bI)/(b) shows the content of the farnesene-derived structural unit (b1) in the sum total of the conjugated diene-derived structural unit (b).
(*3) St-F-St is polystyrene-poly(β-farnesene)-polystyrene tri-block copolymer. St-(Ip/Bd)-St is polystyrene-poly(isoprene/butadiene))-polystyrene tri-block copolymer. St-Bd-St is polystyrene-polybutadiene-polystyrene tri-block copolymer. St-Ip-St is polystyrene-polyisoprene-polystyrene tri-block copolymer.
(*4) Hydrogenation rate is the hydrogenation rate of the carbon-carbon double bond in the conjugated diene-derived structural unit (b).

Examples 42 to 43, and Comparative Examples 43 to 50

The hydrogenated block copolymer shown in Table 11 was used in a thermoplastic elastomer composition.

The thermoplastic elastomer composition was compression-molded at 240° C. and under a load of 10 MPa for 3 minutes to produce a sheet having a thickness of about 0.5 mm. The resultant sheet was evaluated for the physical properties as above. The results are shown in Table 11.

Examples 44 to 51, and Comparative Examples 51 to 60

Using a batch mixer, the components shown in Table 12 were melted and kneaded in the ratio shown in Table 12 at 230° C. and at a screw rotation speed of 200 rpm to prepare a thermoplastic elastomer composition.

The resultant thermoplastic elastomer composition was compression-molded at 240° C. and under a load of 10 MPa for 3 minutes to form a sheet having a thickness of about 0.5 mm. The resultant sheet was evaluated for the physical properties as above. The results are shown in Table 12.

TABLE 11

|  |  |  | Example | | Comparative Example | | | | | | | |
|---|---|---|---|---|---|---|---|---|---|---|---|---|
|  |  |  | 42 | 43 | 43 | 44 | 45 | 46 | 47 | 48 | 49 | 50 |
| Thermoplastic Elastomer Composition |  | unit |  |  |  |  |  |  |  |  |  |  |
| Block copolymer (I-1) | pts. mass | 100 |  |  |  |  |  |  |  |  |  |
| Block copolymer (I-2) |  |  | 100 |  |  |  |  |  |  |  |  |
| Block copolymer (I'-1) | pts. mass |  |  | 100 |  |  |  |  |  |  |  |
| Block copolymer (I'-2) |  |  |  |  | 100 |  |  |  |  |  |  |
| Block copolymer (I'-3) |  |  |  |  |  | 100 |  |  |  |  |  |
| Block copolymer (I'-4) |  |  |  |  |  |  | 100 |  |  |  |  |
| Block copolymer (I'-5) |  |  |  |  |  |  |  | 100 |  |  |  |
| Block copolymer (I'-6) |  |  |  |  |  |  |  |  | 100 |  |  |
| Block copolymer (I'-7) |  |  |  |  |  |  |  |  |  | 100 |  |
| Block copolymer (I'-8) |  |  |  |  |  |  |  |  |  |  | 100 |
| (II) Polystyrene resin | pts. mass | 0 | 0 | 0 | 0 | 0 | 0 | 0 | 0 | 0 | 0 |
| (III) Softening agent | pts. mass | 0 | 0 | 0 | 0 | 0 | 0 | 0 | 0 | 0 | 0 |
| Evaluation results |  |  |  |  |  |  |  |  |  |  |  |  |
| Hysteresis loss in one cycle (1) (%) |  | 15.5 | 13.9 | 100 | 33.2 | 23.8 | 34.5 | 50.1 | 55.0 | — | — |
| Hysteresis loss in two cycles (2) (%) |  | 10.5 | 10.2 | 100 | 11.4 | 7.85 | 12.0 | 20.8 | 24.5 | — | — |
| (2)/(1) |  | 0.68 | 0.73 | 1.00 | 0.34 | 0.33 | 0.35 | 0.41 | 0.45 | — | — |
| 100% modulus (MPa) |  | 0.26 | 0.24 | broken | 2.68 | 1.64 | 3.50 | 2.35 | 4.21 | — | — |

—: Sheet could not be formed owing to molding failure

TABLE 12

| | | | Example | | | | | | | | Comparative Example | |
|---|---|---|---|---|---|---|---|---|---|---|---|---|
| | | | 44 | 45 | 46 | 47 | 48 | 49 | 50 | 51 | 51 | 52 |
| Thermoplastic Elastomer Composition | | unit | | | | | | | | | | |
| | Block copolymer (I-1) | pts. mass | 100 | 100 | 100 | 100 | 85 | 65 | 65 | 65 | | |
| | Block copolymer (I-2) | | | | | | | | | | | |
| | Block copolymer (I'-1) | pts. mass | | | | | | | | | 100 | |
| | Block copolymer (I'-2) | | | | | | | | | | | 100 |
| | Block copolymer (I'-3) | | | | | | 15 | 35 | 35 | 35 | | |
| | Block copolymer (I'-4) | | | | | | | | | | | |
| | Block copolymer (I'-5) | | | | | | | | | | | |
| | Block copolymer (I'-6) | | | | | | | | | | | |
| | Block copolymer (I'-7) | | | | | | | | | | | |
| | Block copolymer (I'-8) | | | | | | | | | | | |
| (II) | Polystyrene resin | pts. mass | 20 | 20 | 11 | 43 | 0 | 0 | 25 | 43 | 0 | 40 |
| (III) | Softening agent | pts. mass | 20 | 70 | 0 | 0 | 0 | 0 | 0 | 0 | 30 | 120 |
| Evaluation results | | | | | | | | | | | | |
| Hysteresis loss in one cycle (1) (%) | | | 15.4 | 13.2 | 18.3 | 19.8 | 13.8 | 17.2 | 14.1 | 18.0 | 88.2 | 20.8 |
| Hysteresis loss in two cycles (2) (%) | | | 11.0 | 9.4 | 12.2 | 13.4 | 8.7 | 9.0 | 8.6 | 10.1 | 79.7 | 9.6 |
| (2)/(1) | | | 0.71 | 0.71 | 0.67 | 0.68 | 0.69 | 0.52 | 0.61 | 0.56 | 0.90 | 0.46 |
| 100% modulus (MPa) | | | 0.20 | 0.08 | 0.29 | 0.44 | 0.12 | 0.14 | 0.65 | 0.82 | broken | 0.36 |

| | | | Comparative Example | | | | | | | |
|---|---|---|---|---|---|---|---|---|---|---|
| | | | 53 | 54 | 55 | 56 | 57 | 58 | 59 | 60 |
| Thermoplastic Elastomer Composition | | unit | | | | | | | | |
| | Block copolymer (I-1) | pts. mass | | | | | | | | |
| | Block copolymer (I-2) | | | | | | | | | |
| | Block copolymer (I'-1) | pts. mass | | | | | | | | |
| | Block copolymer (I'-2) | | | | | | | | | |
| | Block copolymer (I'-3) | | 100 | | | | | | 100 | 100 |
| | Block copolymer (I'-4) | | | | | | | | | |
| | Block copolymer (I'-5) | | | 100 | | | | | | |
| | Block copolymer (I'-6) | | | | 100 | | | | | |
| | Block copolymer (I'-7) | | | | | 100 | 100 | | | |
| | Block copolymer (I'-8) | | | | | | | 100 | | |
| (II) | Polystyrene resin | pts. mass | 0 | 0 | 31 | 0 | 40 | 40 | 11 | 43 |
| (III) | Softening agent | pts. mass | 50 | 75 | 77 | 30 | 120 | 120 | | |
| Evaluation results | | | | | | | | | | |
| Hysteresis loss in one cycle (1) (%) | | | 20.7 | 22.4 | 20.5 | — | 24.2 | 23.4 | 21.6 | 27.6 |
| Hysteresis loss in two cycles (2) (%) | | | 7.2 | 17.3 | 7.6 | — | 20.2 | 18.7 | 8.1 | 14.6 |
| (2)/(1) | | | 0.36 | 0.77 | 0.37 | — | 0.83 | 0.80 | 0.38 | 0.53 |
| 100% modulus (MPa) | | | 0.09 | 0.30 | 0.62 | — | 0.39 | 0.39 | 0.32 | 0.92 |

—: Sheet could not be formed owing to molding failure

Examples 52 to 61, and Comparative Examples 61 to 62

(1) Production of Thermoplastic Elastomer Composition

Using a batch mixer, the components shown in Table 13 were melted and kneaded in the ratio shown in Table 13 at 230° C. and at a screw rotation speed of 200 rpm to prepare a thermoplastic elastomer composition.

(2) Production of Melt-Blown Nonwoven Fabric

The thermoplastic elastomer composition of Table 13 was melted in a 40-mmφ single-screw extruder, and then fed into the die at 300° C. Using a melt-blow spinning apparatus having 0.3-mmφ orifices aligned at a pitch of 1 mm and having injection slits for hot gas arranged on both sides, the polymer was discharged out at a discharge rate of 0.3 g/min/hole, while air heated at 300° C. was sprayed thereonto at a hot air rate of 2.8 Nm³/min per one meter width for thinning the strands. These was collected on a metal mesh belt arranged at 15 cm below the nozzle and wound up with a rear winder to give a nonwoven fabric (elastic member). The resultant nonwoven fabric has a basis weight of 150 g/m², and a filament diameter (mean fiber size) of 9 μm.

(3) Evaluation

The above-mentioned melt-blown nonwoven fabric was re-melted at 240° C., and subsequently compression-molded under a load of 10 MPa for 3 minutes to give a sheet having a thickness of about 0.5 mm. The resultant sheet was evaluated for the physical properties as above. The results are shown in Table 13.

TABLE 13

|  |  | Example | | | | | | | | | | Comparative Example | |
| --- | --- | --- | --- | --- | --- | --- | --- | --- | --- | --- | --- | --- | --- |
|  |  | 52 | 53 | 54 | 55 | 56 | 57 | 58 | 59 | 60 | 61 | 61 | 62 |
| Thermoplastic Elastomer Composition | unit | | | | | | | | | | | | |
| Block copolymer (I-1) | pts. mass | 100 | 100 | 100 | | 100 | 100 | 85 | 65 | 65 | 65 | | |
| Block copolymer (I-2) | | | | | 100 | | | | | | | | |
| Block copolymer (I'-1) | pts. mass | | | | | | | | | | | | |
| Block copolymer (I'-2) | | | | | | | | | | | | 100 | |
| Block copolymer (I'-3) | | | | | | | | 15 | 35 | 35 | 35 | | 100 |
| Block copolymer (I'-4) | | | | | | | | | | | | | |
| Block copolymer (I'-5) | | | | | | | | | | | | | |
| Block copolymer (I'-6) | | | | | | | | | | | | | |
| Block copolymer (I'-7) | | | | | | | | | | | | | |
| Block copolymer (I'-8) | | | | | | | | | | | | | |
| (II) Polystyrene resin | pts. mass | 0 | 20 | 20 | 0 | 11 | 43 | 0 | 0 | 25 | 43 | 0 | 0 |
| (III) Softening agent | pts. mass | 0 | 0 | 20 | 0 | 0 | 0 | 0 | 0 | 0 | 0 | 0 | 0 |
| Evaluation results | | | | | | | | | | | | | |
| Hysteresis loss in one cycle (1) (%) | | 15.5 | 17.5 | 15.4 | 13.9 | 13.9 | 17.5 | 10.5 | 13.1 | 10.7 | 13.7 | 33.2 | — |
| Hysteresis loss in two cycles (2) (%) | | 10.5 | 10.8 | 11.0 | 10.2 | 9.3 | 10.2 | 6.6 | 6.8 | 6.51 | 7.68 | 11.4 | — |
| (2)/(1) | | 0.68 | 0.62 | 0.71 | 0.73 | 0.67 | 0.58 | 0.63 | 0.52 | 0.61 | 0.56 | 0.34 | — |
| 100% modulus (MPa) | | 0.08 | 0.40 | 0.20 | 0.19 | 0.17 | 0.67 | 0.20 | 0.43 | 0.47 | 0.48 | 2.68 | — |

—: Sheet could not be formed owing to molding failure

The elastic members of Examples are excellent in elasticity restoration in that the hysteresis loss rate in the first cycle ($L_1$) is less than 20%. In addition, the hysteresis loss rate in the second cycle ($L_2$) of the elastic members of Examples is low, and the ratio ($L_2/L_1$) is high.

As opposed to these, the elastic members of Comparative Examples are inferior to those of Examples in point of the elasticity restoration since the hysteresis loss rate in the first cycle (1) of thereof is more than 20%.

The invention claimed is:

1. A hydrogenated block copolymer prepared by hydrogenating a block copolymer that comprises a polymer block (A) comprising a structural unit derived from an aromatic vinyl compound, a polymer block (B) comprising a structural unit derived from farnesene, and a polymer block (C) comprising a structural unit derived from a conjugated diene other than farnesene,
wherein:
the block copolymer comprises at least two of the polymer blocks (A), at least one of the polymer block (B) and at least one of the polymer block (C), and wherein at least one of the polymer block (B) is at a terminal,
50 mol % or more of a total of carbon-carbon double bonds in the at least one polymer block (B) and in the at least one polymer block (C) are hydrogenated,
the hydrogenated block copolymer comprises a structure that comprises the polymer block (B), the polymer block (A), and the polymer block (C), in that order, and an order-disorder transition temperature (ODT) of the hydrogenated block copolymer, as measured by dynamic viscoelastometry, is 290° C. or lower.

2. The hydrogenated block copolymer according to claim 1, wherein 70 mol % or more of the total of the carbon-carbon double bonds in the at least one polymer block (B) are hydrogenated.

3. The hydrogenated block copolymer according to claim 1, wherein a ratio by mass of the at least two polymer blocks (A) to a total mass of the at least two polymer blocks (A), the at least one polymer block (B) and the at least one polymer block (C) is from 5/100 to 80/100.

4. The hydrogenated block copolymer according to claim 1, wherein the aromatic vinyl compound is at least one selected from the group consisting of styrene, a-methylstyrene and 4-methylstyrene.

5. The hydrogenated block copolymer according to claim 1, wherein the conjugated diene other than farnesene is at least one selected from the group consisting of butadiene, isoprene and myrcene.

6. The hydrogenated block copolymer according to claim 1, wherein a ratio by mass of the at least one polymer block (C) to the at least one polymer block (B) is from 5/95 to 95/5.

7. The hydrogenated block copolymer according to claim 1, wherein a peak top molecular weight of the at least two polymer blocks (A) is from 2,000 to 100,000, a peak top molecular weight of the at least one polymer block (B) is from 2,000 to 200,000, and a peak top molecular weight of the at least one polymer block (C) is from 4,000 to 200,000.

8. The hydrogenated block copolymer according to claim 1, wherein the ODT of the hydrogenated block copolymer, as measured by dynamic viscoelastometry, is 260° C. or lower.

9. A method for producing the hydrogenated block copolymer of claim 1, comprising:
producing the at least one polymer block (B), the at least two polymer blocks (A) and the at least one polymer block (C) in that order to give a resultant block copolymer, and
hydrogenating the resultant block copolymer.

10. A hydrogenated block copolymer composition comprising the hydrogenated block copolymer of claim 1, and at least one selected from the group consisting of a polyolefin resin, a tackifier resin and a softening agent.

11. A molded article comprising the hydrogenated block copolymer of claim 1.

12. A laminate comprising a layer comprising the hydrogenated block copolymer of claim 1.

13. A film comprising the hydrogenated block copolymer of claim 1.

14. A protective film comprising the laminate of claim 12.

15. A fiber comprising the hydrogenated block copolymer of claim 1.

16. A nonwoven fabric comprising the hydrogenated block copolymer of claim 1.

17. A decorative molding material comprising the laminate of claim 12.

18. An adhesive comprising the hydrogenated block copolymer of claim 1.

19. A hydrogenated block copolymer prepared by hydrogenating a block copolymer that comprises a polymer block (A) comprising a structural unit derived from an aromatic vinyl compound, a polymer block (B) comprising a structural unit derived from farnesene, and a polymer block (C) comprising a structural unit derived from a conjugated diene other than farnesene, wherein:
the block copolymer comprises at least two of the polymer blocks (A), at least one of the polymer block (B) and at least one of the polymer block (C), and wherein at least one of the polymer block (B) is at a terminal, 50 mol % or more of a total of carbon-carbon double bonds in the at least one polymer block (B) and in the at least one polymer block (C) are hydrogenated, the hydrogenated block copolymer comprises a structure that comprises the polymer block (B), the polymer block (A), and the polymer block (C), in that order, and a peak top molecular weight of the at least two polymer block blocks (A) is from 2,000 to 100,000, a peak top molecular weight of the at least one polymer block (B) is from 2,000 to 200,000, and a peak top molecular weight of the at least one polymer block (C) is from 4,000 to 200,000.

* * * * *